United States Patent
Fainberg

(10) Patent No.: US 10,140,391 B2
(45) Date of Patent: Nov. 27, 2018

(54) METHOD OF RAY TRACING FOR USE IN A SIMULATION OR CALCULATION PROCESS

(71) Applicant: MAGMA Giessereitechnologie GmbH, Aachen (DE)

(72) Inventor: Jakob Fainberg, Aachen (DE)

(73) Assignee: MAGMA GIESSEREITECHNOLOGIE GMBH, Aachen (DE)

( * ) Notice: Subject to any disclaimer, the term of this patent is extended or adjusted under 35 U.S.C. 154(b) by 0 days.

(21) Appl. No.: 15/322,297

(22) PCT Filed: Jul. 1, 2015

(86) PCT No.: PCT/EP2015/064990
§ 371 (c)(1),
(2) Date: Dec. 27, 2016

(87) PCT Pub. No.: WO2016/001308
PCT Pub. Date: Jan. 7, 2016

(65) Prior Publication Data
US 2017/0154129 A1 Jun. 1, 2017

(30) Foreign Application Priority Data

Jul. 1, 2014 (DK) .................... 2014 00348

(51) Int. Cl.
*G06T 15/06* (2011.01)
*G06F 17/50* (2006.01)
*G06F 17/10* (2006.01)

(52) U.S. Cl.
CPC .............. *G06F 17/50* (2013.01); *G06T 15/06* (2013.01); *G06F 17/10* (2013.01); *G06F 17/5009* (2013.01); *G06F 2217/16* (2013.01); *G06T 2210/52* (2013.01)

(58) Field of Classification Search
None
See application file for complete search history.

(56) References Cited

U.S. PATENT DOCUMENTS

| | | | | |
|---|---|---|---|---|
| 6,023,279 A * | 2/2000 | Sowizral | ................. | G06T 15/06 345/421 |
| 6,556,200 B1 * | 4/2003 | Pfister | .................... | G06T 15/06 345/426 |
| 7,554,540 B2 * | 6/2009 | Hayes | .................... | G06T 15/06 345/419 |
| 7,852,336 B2 | 12/2010 | Brown et al. | | |

(Continued)

FOREIGN PATENT DOCUMENTS

| | | |
|---|---|---|
| EP | 2648107 A1 | 10/2013 |
| WO | 2014106670 A1 | 7/2014 |

OTHER PUBLICATIONS

W. Lefer, "An Efficient Parallel Ray Tracing Scheme for Distributed Memory Parallel Computers" pp. 77-80, IEEE 1993.*

(Continued)

*Primary Examiner* — Kibrom K Gebresilassie
(74) *Attorney, Agent, or Firm* — Ziegler IP Law Group, LLC

(57) ABSTRACT

A method of ray tracing by parallel computing on a computer system including a plurality of CPU's, for use in a simulation or calculation process, the method including balancing a plurality of radiation tiles between said plurality of CPU's.

12 Claims, 19 Drawing Sheets

(56) References Cited

U.S. PATENT DOCUMENTS

| | | | | |
|---|---|---|---|---|
| 7,868,891 B2* | 1/2011 | Wexler | ............... | G06F 9/505 345/419 |
| 8,587,588 B2* | 11/2013 | Smyth | ............... | G06T 15/06 345/419 |
| 8,795,087 B2* | 8/2014 | Kim | ............... | H04L 67/1002 463/42 |
| 9,092,901 B2* | 7/2015 | Wald | ............... | G06T 15/06 |
| 9,665,970 B2* | 5/2017 | Redgrave | ............... | G06T 15/005 |
| 9,741,155 B2* | 8/2017 | Park | ............... | G06T 15/005 |
| 2003/0043169 A1* | 3/2003 | Hunter | ............... | G06T 15/503 345/611 |
| 2003/0227457 A1* | 12/2003 | Pharr | ............... | G06T 15/80 345/426 |
| 2004/0100465 A1* | 5/2004 | Stowe | ............... | G06T 15/00 345/427 |
| 2005/0041031 A1* | 2/2005 | Diard | ............... | G06T 15/005 345/505 |
| 2009/0167763 A1* | 7/2009 | Waechter | ............... | G06T 15/06 345/426 |
| 2009/0256845 A1* | 10/2009 | Sevastianov | ............... | G06T 15/06 345/426 |
| 2010/0194751 A1* | 8/2010 | Wald | ............... | G06T 15/06 345/426 |
| 2011/0234583 A1 | 9/2011 | Bakalash | | |
| 2013/0069943 A1* | 3/2013 | Kallio | ............... | G06T 15/005 345/420 |
| 2014/0168238 A1* | 6/2014 | Luebke | ............... | G06T 17/005 345/522 |
| 2014/0176574 A1 | 6/2014 | Bakalash | | |
| 2014/0270344 A1* | 9/2014 | Krishnamoorthi | ... | G06K 9/6211 382/103 |
| 2015/0091895 A1* | 4/2015 | Shin | ............... | G06T 15/06 345/419 |
| 2016/0048614 A1* | 2/2016 | Fainberg | ............... | G06F 17/5009 703/2 |
| 2017/0161934 A1* | 6/2017 | Fainberg | ............... | G06T 15/06 |

OTHER PUBLICATIONS

T. Klove, T. T. Lin, S. C. Tsai, W. G. Tzeng, "Permutation arrays under the Chebyshev distance" pp. 1-7, IEEE 2008.*

Gudukbay U et al. "PHR: a parallel hierarchical radiosity system with dynamic load balancing", In: The Journal of Supercomputing, Mar. 2005, vol. 31, No. 3, ISSN 0920-8542, doi: 10.1007/s11227-005-0107-4, 15 pages.

P.S. Cumber et al, "A Parellelization Strategy for the Discrete Transfer Radiation Model", Numerical Heat Transfer, Part B: Fundamentals, vol. 34, No. 3, Oct. 1, 1998, ISSN: 1040-7790, DOI: 10.1080/10407799808915059, 18 pages.

P.J. Novo, "Parallelization of the Discrete Transfer Method", Numerical Heat Transfer, Part B: Fundamentals, vol. 35, No. 2, Mar. 1, 1999, ISSN: 1040-7790, DOI: 10.1080/104077999275929, 26 pages.

J. Fainberg et al., "A fast efficient adaptive parallel ray tracing based model for thermally coupled surface radiation in casting and heat treatment processes.", IOP Conference Series: Materials Science and Engineering, vol. 84, Jun. 11, 2015, ISSN: 1757-899X/84/1/012004, 12 pages.

J. G. Marakis et. al., "Parallel ray tracing for radiative heat transfer. Application in a distributed computing environment", International Journal of Numerical Methods for Heat and Fluidflow, MCB University Press, GB, vol. 11 No. 7, Jan. 1, 2001, 20 pages.

International Search Report, Application No. PCT/EP2015/064990, dated Oct. 13, 2015, 3 pages.

Danish Patent and Trademark Office, Search Report, Application No. PA 201400348, dated Jan. 30, 2015, 5 pages.

Danish Patent and Trademark Office, Second Technical Examination, Application No. PA2014 00348, dated Jun. 29, 2015, 2 pages.

Danish Patent and Trademark Office, Intention to Grant, Application No. PA201400348, dated Aug. 31, 2015, 2 pages.

Sireli, A. R.: Parallelization of Hierarchical Radiosity Algorithms on Distributed Memory Computers (Master Thesis, Bilkent University, 1999), Jan. 1999, 112 pages.

Germany Patent Office, Office Action, Application No. DE112015003095.6, dated Dec. 18, 2017, 11 pages.

* cited by examiner

| 3 | 2 | 2 | 2 | 2 | 2 |
|---|---|---|---|---|---|
| 3 | 2 | 1 | 1 | 1 | 2 |
| 3 | 2 | 1 | 0 | 1 | 2 |
| 3 | 2 | 1 | 1 | 1 | 1 |
| 3 | 2 | 2 | 2 | 1 | 0 |

A

| 3 | 2 | 2 | 2 | 4 | 4 |
|---|---|---|---|---|---|
| 3 | 2 | 1 | 1 | 3 | 3 |
| 3 | 2 | 1 | 0 | 2 | 2 |
| 5 | 4 | 3 | 2 | 1 | 1 |
| 5 | 4 | 3 | 2 | 1 | 0 |

METHOD OF RAY TRACING FOR USE IN A SIMULATION OR CALCULATION PROCESS

FIELD OF THE INVENTION

The invention relates generally to a method to be used in a simulation or calculation process and more specifically to a method of the above kind designed for achieving savings in terms of computer time and computer memory used. Still more specifically, the invention relates to ray tracing by parallel computing.

The invention is described within the framework of helpful methods and algorithms applied as parts of a simulation method for calculating the thermal surface radiation and the use thereof for simulating the influence of thermally coupled surface radiation, specifically in relation to casting processes. However, the use of the method according to the invention is not limited solely to this specific application. As examples of further applications of the methods according to the invention computer graphics applications in general and specifically for use in computer games, could be mentioned.

BACKGROUND OF THE INVENTION

Bindick, Ahrenholz and Krafczyk summarized the state of the art within the technical field of thermally coupled radiation in three dimensions in "*Heat Transfer—Mathematical Modelling, Numerical Methods and Information Technology*", ISBN 978-953-307-550-1, Aziz Belmiloudi Editor, printed 2011 Feb. 14, Chapter 7—"*Efficient Simulation of Transient Heat Transfer Problems in Civil Engineering*" (see section 7.3 in particular). Their observations are hereby incorporated in their entirety in referring to this work.

EP 1 667 069 A1 describes a method for determining the distribution of the local radiation intensity in a semi-transparent medium by using ray tracing, wherein a significantly quicker method with a simultaneously smaller memory requirement for determining the distribution of the local radiation intensity in a semi-transparent medium exhibiting at least one boundary surface was introduced.

Simulation and calculation methods using ray tracing techniques that require many calculations and a large number of numerical results being stored in a computer. Hence it would be desirable to provide methods that achieve savings in terms of computer time and computer memory used.

SUMMARY OF THE INVENTION

On the above background it is an object of the present invention to provide a method for use in simulations carried out not only in connection with thermal problems but also in connection with general computer graphics based on ray tracing, which that achieves savings in terms of computer time and computer memory used.

The invention therefore further relates to a method of ray tracing for use in a simulation or calculation process, in order to achieve acceleration and savings in terms of computer time and computer memory used. In particular, an unconventional method is proposed by means of parallel computing to accelerate a ray tracing calculation alone and combined with anisotropic Chebyshev distance calculations and/or additional acceleration through tile clustering.

The above and other objects and advantages are obtained according to the invention by the discretization method defined in the independent claim. Various embodiments of the method according to the invention are defined in the dependent claims.

According to a first aspect of the invention there is provided method of ray tracing by means of parallel computing on a computer system comprising a plurality of CPU's, for use in a simulation or calculation process, the method comprising:

1) In a first section
   a) defining at least one radiation source;
   b) defining a number of radiation tiles forming a plurality of radiation tiles, and a number of grid cells forming a plurality of grid cells, said plurality of grid cells comprising said plurality of radiation tiles;
   c) creating a global grid model comprising grid data, said grid data comprising information on said plurality of radiation tiles and said plurality of grid cells;
   d) optionally reducing said number of radiation tiles by tile clustering to generate a number of radiation tiles smaller than said number of radiation tiles initially defined;
   e) communicating said grid data of said global grid model to said plurality of CPU's;
   f) balancing said number of radiation tiles between said plurality of CPU's, thereby creating for each CPU a list of own radiation tiles to be processed and a list of imported radiation tiles to be processed, and a list of CPU donators and CPU acceptors; and 2) In a second section
   g) optionally calculating for each radiation tile an anisotropic Chebyshev-distance;
   h) performing ray tracing by parallel computing on each CPU, starting for each CPU with said CPU's list of own radiation tiles to be processed, by
      dispatching all rays of said ray tracing on each CPU independently of one another,
      locating radiation sources,
      optionally geometrically and/or thermally adapting said located radiation sources,
      storing said located radiation sources directly in said list of own radiation tiles to be processed; and
   i) when all own radiation tiles to be processed have been processed,
      repeating the above step h) for imported radiation tiles to be processed on said CPU acceptors until there are no radiation tiles to be processed, and
      temporarily storing in a buffer said located radiation sources for said imported radiation tiles to be processed that are located by said ray tracing;
   j) whereupon, after processing of all radiation tiles, said CPU acceptors transmit said located radiation sources of said imported radiation tiles to be processed back to said CPU donators; and
   k) said located radiation sources of said imported radiation tiles to be processed as received by said CPU donator are written into said CPU donator's list of own radiation tiles to be processed, preferably immediately after receipt from a CPU acceptor; and
   l) optionally deleting data that is no longer needed;
whereby acceleration and savings in terms of computer time and computer memory used is achieved.

According to a first embodiment of the first aspect of the invention, said method of ray tracing is a method of voxel-based ray tracing with reverse ray tracing.

According to a second embodiment of the first aspect of the invention in step f) said balancing of said number of radiation tiles between said plurality of CPU's is accomplished by I. determining the number of locally defined radiation tiles N existing on a CPU;
II. calculating an arithmetic mean $N_{av}$ across said plurality of CPU's;
III. virtually removing a portion of radiation tiles ΔN from a CPU-donator with an excess of radiation tiles $N_1 > N_{av}$ and assigning said excess to a CPU-acceptor next located with $N_2 < N_{av}$, such that either a condition $N_1 = N_{av}$ or $N_2 = N_{av}$ is satisfied; and
IV. repeating step III. until neither $N_1 = N_{av}$ nor $N_2 = N_{av}$ is satisfied.

According to a third embodiment of the first aspect of the invention, the method comprising characterizing all rays leaving a radiation tile during ray tracing as a bundle of vectors, each vector indicating a direction of an individual ray $\vec{\Omega}$, and wherein said bundle of vectors, before ray tracing begins, is centred about a normal vector of each respective radiation tile through multiplication of said vectors with a rotational matrix which converts a central vector of said bundle of vectors in a Cartesian direction +Z into said normal vector of said radiation tile.

According to a fourth embodiment of the invention, the method comprising if assigning for each side of each grid cell of said plurality of grid cells an ID, then for each of said radiation tiles, three ID's are stored per grid cell for each radiation tile, thereby fully characterizing said plurality of radiation tiles with respect to said global grid model.

According to a fifth embodiment of the invention, the method comprising performing during ray tracing a search for a next intersection between a continuation of a dispatched ray and an individual side of a grid cell in which said dispatched ray is currently located.

According to a sixth embodiment of the invention, the method comprising
wherein three possible sides of said grid cell wherein said dispatched ray is currently located are checked for a next intersection, said possible sides given by the sign of the three components of said ray direction $\vec{\Omega}$;
wherein a next intersection having the minimum distance from said current ray position defines a next point on said dispatched ray; and
wherein an individual side of said grid cell wherein said dispatched ray is currently located having a minimum length up to said next intersection is determined, and said dispatched ray continued as far as said located next intersection in said ray direction $\vec{\Omega}$ by a located length $\Delta X^{ray}$, where:

$$X_{MIN} = MIN_{L=(i,j,k)} \frac{X_l - X_l^{ray}}{\Omega_l} \text{ and } \Delta X_i^{ray} = X_{MIN}\Omega_i;$$

wherein, when said next intersection has been found, an ID of a corresponding tile on said individual side comprising said next intersection of said grid is requested; and wherein
if said ID of said corresponding tile corresponds to an actual radiation tile, said ray tracing is stopped and an global ID of a radiation source that has been located is returned; or if said ID of a corresponding tile corresponds to a symmetry plane having a Cartesian normal vector, a directional component of said dispatched ray normal to said symmetry plane is inverted and said dispatched ray traced further as a reflected ray; or otherwise
said ray tracing procedure is repeated in a next grid cell until said dispatched ray encounters a radiation tile or leaves the boundaries of said grid model, in which latter case, a fixed ID is returned indicating outer space.

According to a seventh embodiment of the invention, the method wherein the simulation or calculation process is a simulation or calculation process of heat flux from a radiant surface, or a method of computer image rendering.

According to a second aspect, the invention relates to a computer software product on a computer-readable medium, which provides a software code for carrying out the according to the first aspect of the invention.

BRIEF DESCRIPTION OF THE DRAWINGS

The invention will be better understood with reference to the following detailed description in conjunction with the figures of the drawing, in which

FIG. 10 is an illustration of the Chebyshev distance with the help of 2D examples: 10A: Isotropic Chebyshev distance; 10B: Anisotropic Chebyshev distance;

DETAILED DESCRIPTION OF THE INVENTION

Figure 1:
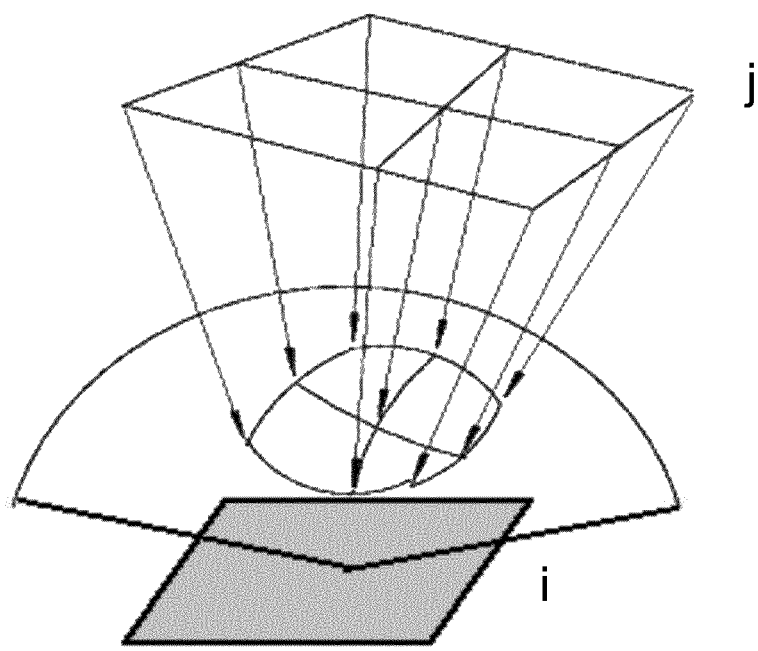
FIG. 1 is an illustration of the solid angle through half a unit sphere.

The following detailed description of the invention will illustrate the application of the discretization of the solid angle according to the present invention specifically in connection with thermal calculations. It should, however, be noted that this is only a single example of a technical field in which the present invention can be applied. More generally, it can be applied in computer graphics based on ray tracing techniques.

Many important properties, such as viscosity, electrical conductivity, the specific volume or chemical reactivity of a material or medium are determined by temperature. For example, in the field of melting, purification and/or the forming of solid substances such as metals, glass, ceramics, for example, observing certain temperatures, frequently also in a time-dependent manner, takes on great significance.

An application of the method according to the present invention is concerned with the calculation of the thermal surface radiation and the use thereof to simulate the influence of thermally coupled surface radiation, particularly in relation to casting processes.

The illustrative examples given below also comprises a method for simulating the influence of thermally coupled surface radiation on a solid body, which solid body has at least one surface capable of being exposed to radiation, by calculating the radiative exchange between grey, diffuse surfaces, characterized in that the surface or surfaces to be exposed to radiation is/are subdivided adaptively, hierarchically into radiation tiles of the same or virtually the same radiation intensity, and the surface temperature resulting from irradiation is achieved by means of a hierarchical view factor method, which view factor method comprises the evaluation of a solid angle integral using a primary solid angle subdivision, which primary solid angle subdivision comprises a homogeneous view factor discretization, wherein each solid angle subdivision is adaptively and hierarchically discretized into its partial areas by spherical projection and wherein the total of all partial amounts of that solid angle integral can be determined by means of ray tracing.

Principles
Energy Balance at the Radiant Surface

The surface radiation is taken into account in a thermal model by adapting the equation for the energy balance condition at the radiant surface.

Without radiation this condition alone is expressed by the heat conduction flows, $$(\lambda_L \vec{\nabla}_L T - \lambda_R \vec{\nabla}_R T) \vec{N} = 0 \qquad (1)$$

The variables with the indices L and R in (1) characterize the heat conductivities and temperature gradients correspondingly to the left and right of the surface. The vector $\vec{N}$ is the normal surface vector.

An additional term, the net heat flux density, enters the balance equation (1) through radiation:

$$(\lambda_L \vec{\nabla}_L T - \lambda_R \vec{\nabla}_R T) \vec{R} + q_{net} = 0 \qquad (2)$$

The equation (2) must be solved in a thermally coupled model with surface radiation.

The net heat flux is made up of the difference between the absorbed and emitted radiant heat $$q_{net} = \epsilon(q_{in} - \sigma T^4) \qquad (3)$$

$\epsilon$ in (3) is the emissivity of the surface. In the case of the so-called grey and diffuse radiant surface, it is averaged out hemispherically via the entire electromagnetic spectrum and via the solid angle. It is also assumed in the same way as the absorption coefficients likewise averaged out.

$q_{in}$ in (3) is the incident heat flux density. The problem addressed by a numerical model for surface radiation is that of determining the values of the incident radiation at each part of the radiant surface.

Calculating the Incident Heat Flux

The incident heat flux is coupled by an integral to the outgoing heat flux:

$$q_{in} = \int_{(\vec{\Omega} \vec{N}) > 0} (\vec{\Omega} \vec{N}) q_{out} \partial \Omega \qquad (4)$$

Integration takes place via the solid angle $2\pi$. The result applies to the centre of the piece of the radiant surface.

The view factors method replaces the integral in (4) with a total through the contributions of the individual subdivisions of the radiant surface, for which direct visibility exists through linear optics. In a normal case, the faces of the numerical grid act as individual elements of the surface, wherein the clustering of a plurality of adjacent faces of the grid in radiating elements of this kind is also known according to the hierarchical view factor method.

The solid angle is often depicted by half a unit sphere, as indicated by reference numeral 1 in FIG. 1. A unit sphere is placed about the centre of the radiant surface 3. The surrounding visible radiant surface grid 4 is centrally projected 5 onto the unit sphere 1. According to the Nusselt principle, the component of the projection onto the unit sphere parallel to the equatorial plane is equal to the view factor in each case.

Calculation of the view factors is illustrated geometrically in FIG. 1. In order to determine the value of a view factor between the surface j outside and the surface i (shaded grey in the image), the visible part of face j should be projected onto the unit sphere about the centre of face i to begin with. The calculation of the total integral (4) involves the projection of the entire radiating grid 4 onto the unit sphere 1, as is illustrated in FIG. 1.

The complexity of the quadrature (4) is generally proportional to the square of the subdivisions of the radiant surface through the numerical grid. The calculation according to (4) can therefore lead to an excessive memory and computational work requirement, particularly for large, complex geometries.

The geometric diagram of the view factors method according to FIG. 1 can be inverted, which may result in principle in a smaller memory requirement and less computational work.

In the case of view factors, the subdivision (discretization) of the solid angle is fixed by the previously generated numerical grid. The refinement of the subdivision completely exists through the numerical grid.

Figure 2:
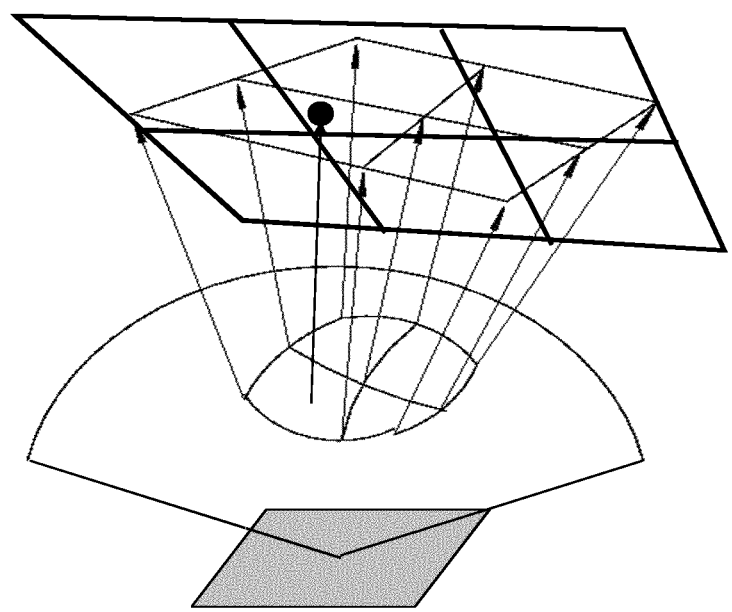
FIG. 2 is an example of the securely embedded discretization of the solid angle.

Conversely, however, it is possible to fix any subdivision of the solid angle initially independently of the numerical grid at the edge of the transparent cavity in the first step. In the second step, this subdivision of the unit sphere is then projected onto the surrounding grid. This principle is explained in FIG. 2.

This diagram leads to another logic in the integration of the heat flux according to equation (4). While the problem addressed by the view factor method involves determining the individual subdivisions of the solid angle, the subdivisions being a map of the visible subdivisions of the surface, the individual subdivisions 6, 7, 8, 9 of the solid angle are fixed in the alternative method and therefore known in advance. The actual problem is now looking for a representative element of the radiating grid which assumes the role of the radiation source for the given piece of the subdivision of the solid angle. It is therefore assumed that the radiation intensity emanating from the located radiation source is uniformly present in the entire subdivision of the solid angle (see FIG. 2).

The following approach is taken with the securely embedded discretization of the solid angle. In the first step, a particular subdivision of the unit sphere about the centre of the selected radiant face i is undertaken independently of the numerical grid. In the second step, a central projection of this subdivision onto the surrounding grid is carried out. The direction of the projection is illustrated upwards by arrows 10 in FIG. 2; cf. the reverse projection direction in the view factors method in FIG. 1. The projection of the centre point of each part of the solid angle is assigned to an element of the radiating grid (such as point 11a), so that the entire subdivision of the solid angle is mapped onto the radiant face elements.

An error in the discretization of the distribution of the heat flux over the solid angle occurs if the part of the solid angle being observed, projected onto the radiant grid, has face elements with widely divergent emitted heat flux densities, which leads to a great variation in radiation intensity within the solid angle.

The advantage of this method is that complex geometric analysis of the masking is dispensed with. For each subdivision of the solid angle starting from the centre of the face, a single test ray is sent out. The ray direction corresponds to the centre point of the given part of the solid angle.

The sending out of rays or ray tracing is dealt with in greater detail in the section entitled "Ray tracing".

Radiation Tiles

The method of subdividing the radiant surfaces is illustrated by way of example below by means of the numerical grid currently used in the MAGMAsoft program (MAGMA Gießereitechnologie GmbH). The method can, however, be used in principle for any grid types without restriction.

MAGMAsoft uses a tensor product grid. The 3D grid is made up of three systems of grid lines in 3 Cartesian spatial directions X, Y, and Z, which run through the entire model and embed it in a cuboid. The grid is therefore made up of orthogonal cuboid cells.

The numerical grid therefore consists of an orthogonal grid and is therefore only completely defined by the material distribution over the grid cells in this grid and three rows of coordinates along the three Cartesian directions. The individual radiant surfaces in the radiation model are found in the grid during their initialization by material proximities in the grid. A radiant surface is defined as a right-angled facet of a grid cell with the normal vector in one of the 6 spatial directions +X, −X, +Y, −Y, +Z, −Z, if one of the 2 conditions is satisfied:

1. The facet divides two grid cells, one of which is covered with an opaque material and another with a transparent. The normal vector points in the direction of the transparent cell. The transparent material in MAGMAsoft is normally air, in which case only the heat conduction is calculated.

2. The facet divides two grid cells, one of which is covered with an opaque material and another with the ID boundary material. The cell with the boundary material lies outside the computation area of MAGMAsoft. A facet of this kind is defined as a radiating face if it does not lie at the boundary of the bounding box of the grid, namely because no other facet is visible there viewed from the surface. In this case, the determination of the net heat flux is trivial.

The radiant faces defined in this manner contribute to the energy balance according to equation (2). They are referred to below as radiation tiles or tiles.

Discretization of the Solid Angle

The complete solid angle is subdivided in this method in such a manner that each subdivision corresponds to the same view factor VF, namely $VF_j = 1/N = const$, wherein N is the total number of subdivisions. A homogeneous subdivision of the unit sphere of this kind in relation to view factors is not a homogeneous subdivision of its surface on account of the term $(\vec{\Omega}\vec{N})$ in the corresponding integral:

$$\int_{\Omega_i} (\vec{\Omega}\vec{N})\partial\Omega = \int_\phi \int_\theta \sin(\theta)\cos(\theta)\,\partial\phi\,\partial\theta = \frac{\pi}{N} = const. \quad (5)$$

The advantage of a subdivision of this kind emerges when calculating the incident heat flux according to equation (4). The view factor which is constantly the same can be excluded, since determination of the incident flux changes into an averaging of the outgoing flux.

$$q_{in}^i = \frac{1}{N}\sum_{j=1}^{N} q_{out}^j. \quad (6)$$

A uniform distribution of the unit sphere according to the view factors is not unambiguous and can take place in innumerable ways. The method chosen here additionally requires a certain symmetry in subdivision in relation to the normal vector of the radiation tile and is easy to handle.

Figure 3:
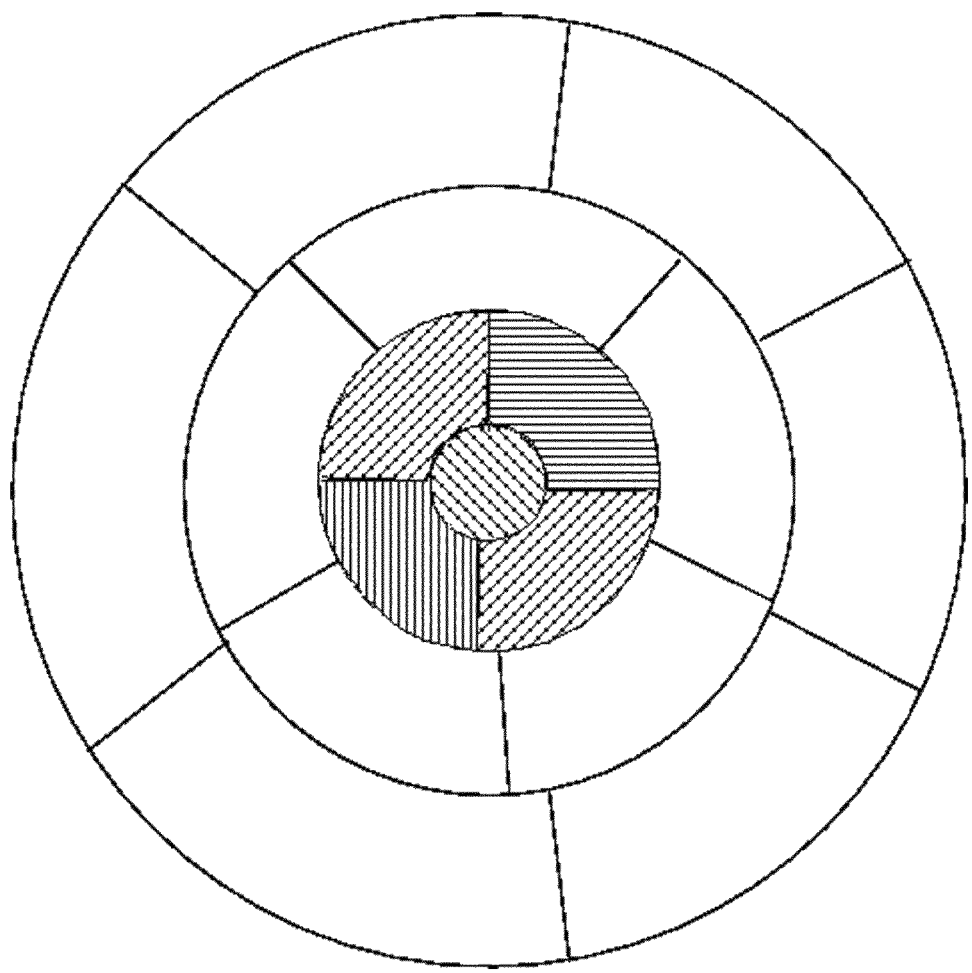
FIG. 3 is an illustration of the chosen principle of the fixed subdivision of the unit sphere, the view "from above" along the normal direction of the radiation tile, wherein the subdivision resembles a target and comprises the azimuthally arranged segments, which in turn form radial rings.

Referring to FIG. 3, the unit sphere is axially symmetrical to begin with, starting from a circle 12 at the north pole, subdivided into a series of radially consecutive rings 13, 14, 15. Each ring is then subdivided into a different number of ring segments in the azimuth direction, such as the segments $15_1, 15_2, 15_3, 15_4, 15_5, 15_6$. Each segment is a spherical rectangle bounded by 2 azimuth lines, such as 16 and 17 and 2 meridional coordinate lines (circular arcs), such as 18 and 19, of the spherical coordinate system. As it appears from FIG. 3, the number of subdivisions in individual rings forms an arithmetical progression.

The subdivision can be completely parameterized by the number of rings n in the meridional direction and the number of azimuth segments of the first ring at the north pole r. For each possible parameterization (n, r) there is a single solution for the meridional coordinates of the rings, so that each spherical segment can always be assigned the same view factor:

$$\theta_i = \frac{1}{2}\arccos\left(1 - \frac{(n-i+1)(2r+n+i-2)}{N}\right). \quad (7)$$

N in (7) is the total number of subdivisions according to the arithmetical progression, $$N = \frac{2r+n-1}{2}n + 1. \quad (7a)$$

Figure 4:
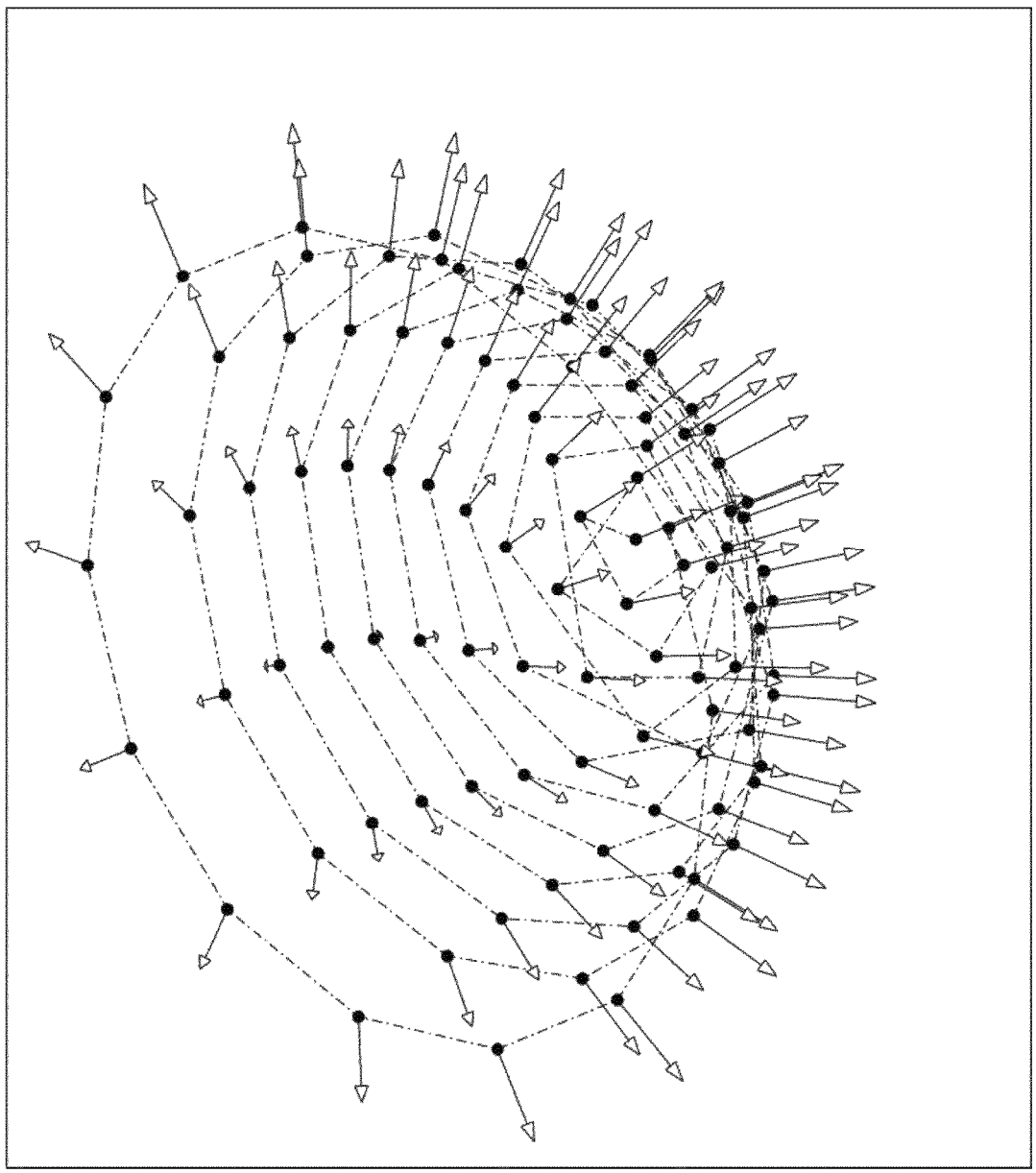
FIG. 4 is an example of the system of direction vectors for parameterization (r=4, n=10) resulting from the equation (7), wherein the total number of directions according to (7a) is equal to N=86.

The number of subdivisions N and therefore also the number of rays per one tile 3 grows quadratically according to (7a) with the number of defined meridional rings n (see FIG. 4).

The segments in a ring as shown in FIG. 3 may be turned in the azimuth direction about a free angle $\alpha 1$, $\alpha 2$, so that a greater angle distance is created between segments of the adjacent rings.

Hierarchical System

An excessively rough subdivision of the unit sphere leads to numerical errors in the integration of the heat flux, as was explained in the section entitled "Energy balance on the radiant surface". In order to achieve a higher angle resolution in relation to the geometry of the radiating grid, work is conducted in this method with a hierarchical system of discretization levels. This method is similar to the various refinement stages of the numerical grid in an explicit multi-grid method.

The first level is represented by the system of spatial directions produced according to the equation (7), see FIG. 4. The next level is produced by subdividing each segment of the first level by doubled halving in the azimuth and meridional direction, in other words by quartering.

The exception exists with the first refinement of the circular region 12 at the north pole, which is divided with 4 azimuth subdivisions into 4 spherical triangles. Where there are further subdivisions, no exception rules apply, all spherical regions are refined as spherical rectangles, as described above. The 4 spherical triangles around the north pole are treated as abnormal spherical rectangles from the third refinement level.

Thereafter the next finer level is further subdivided recursively according to the same principles. This produces a geometric progression of the number of rays at each successive level. For k levels of refinement $$N_{tot} = N\frac{4^k - 1}{3} = \left(\frac{2r+n-1}{2}n + 1\right)\frac{4^k - 1}{3}. \quad (7b)$$

rays result overall on all refinement levels.

The directional vectors according to the refinement are shown in FIGS. 5A, B and C. Three refinement levels are used in the current implementation.

In the hierarchical method of ray tracing, rays are initially sent out in succession from all refinement levels and all results thereby obtained are stored. The results are then evaluated.

Adaptation to the Geometry and Temperature Distribution

It would be entirely possible to undertake the hierarchical subdivision of the solid angle described in the preceding section virtually and only send rays for the vectors of the finest level reached. The result would be that all radiation sources located following ray tracing would have to be processed in the thermal model, something that would have resulted in an unnecessarily large amount of computational work in the event of a large number of rays. If, for example, the angle resolution set by the number of rays in one spatial direction is too high, the same radiation source defined by a radiation tile would be encountered multiple times by different rays. The angle resolution from the coarser refinement levels would therefore be adequate at this point.

Figure 5:
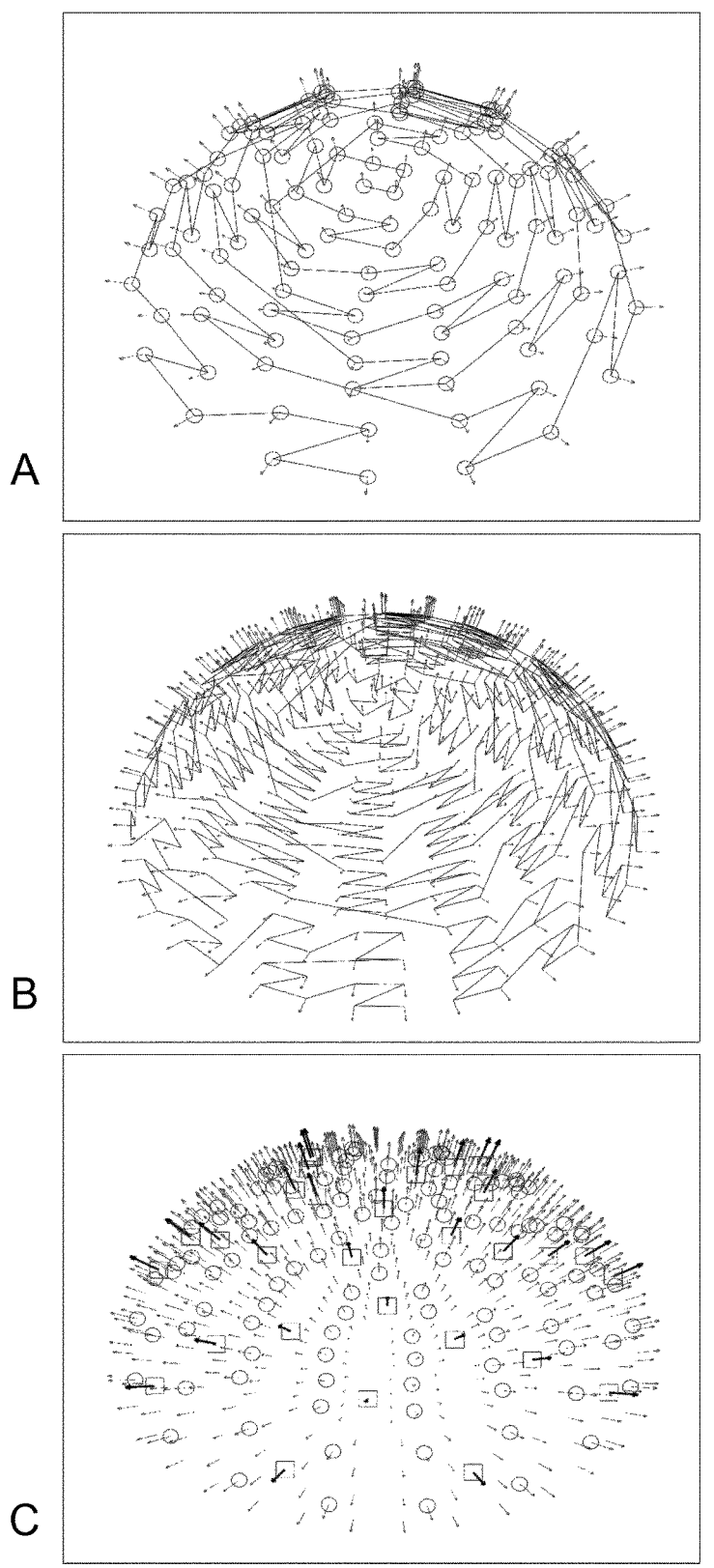
FIG. 5A is the second refinement level created from the first level with subdivision (r, n)=(4,10)
FIG. 5B is the third level created from the second level.
FIG. 5C illustrates direction vectors from all three levels, wherein vectors from different levels are characterized using different symbols at the origin of the vectors and wherein the rays for all directions shown are sent out according to the ray tracing method.

If, however, the rays are sent by all defined refinement levels, the possibility exists for the angle resolution to be adapted locally. The result of ray tracing for the thermal calculation without adjustment would be a complete list of radiation sources, which all result either from the primary subdivision (FIG. 4) or from one of the refinement levels (FIG. 5).

The local adaptation of the angle discretization replaces a list of this kind with sub-lists from all discretization levels. The approach in this case is as follows.

The subdivisions of all refinement levels are marked beforehand as "not refined". It is initially assumed that the discretization only contains vectors 20 of the most refined level. The subdivisions of the next coarser level are then passed through until the coarsest primary level is reached.

Each time the radiation sources of the preceding finer level are checked, said radiation sources corresponding to the four quarters of the subdivided spherical rectangular of the finer level. The previously defined active radiation sources of the 4 quarters are either replaced by a radiation source from the current spherical segment or retained.

1. If at least one of the 4 subdivisions is already marked as "refined", all radiation sources already defined on the finer levels within the current spherical segment are retained and the source from the current level is rejected.
2. If all 4 rays of the finer level have encountered the same opaque material or all 4 rays have come to nothing, i.e. have left the half-open transparent cavity, the radiation sources of the finer level already defined are rejected and replaced by the radiation source of the current level.
3. If 4 rays both leave the cavity and also encounter an opaque material, the radiation sources already defined from the finer levels are retained.
4. If 4 rays encounter different opaque materials, the temperatures of the radiation tiles encountered are compared with one another. If the hierarchical system of the directions is adapted for the first time during this prior to thermal simulation, temperatures of the sources come from the first temperature initialization for different materials. Otherwise, if the adjustment takes place dynamically during the course of the calculation, these are the currently calculated temperatures. If the absolute difference between the maximum and minimum temperature relative to the maximum temperature is smaller than the fixed defined boundary, the radiation sources of the finer level already defined are likewise rejected and replaced by a source from the current level. Otherwise they are retained.
5. Once a subdivision in the current level is processed, it is marked as either "refined" or "not refined", depending on the outcome. If this results in the replacing of the sources of the finer levels with a source of the current level, this is entered in the list of sources taken into account of the current refinement level. If one of the sources is marked as "not refined", the source is entered in the list of sources taken into account for the finer level. The entry is made only if the new source belongs to a surface of the opaque material. Otherwise, the view factor of the outer unmasked space is increased by a constant value of the current refinement level i equal to $$\frac{1}{N4^{i-1}}.$$

Figure 6:
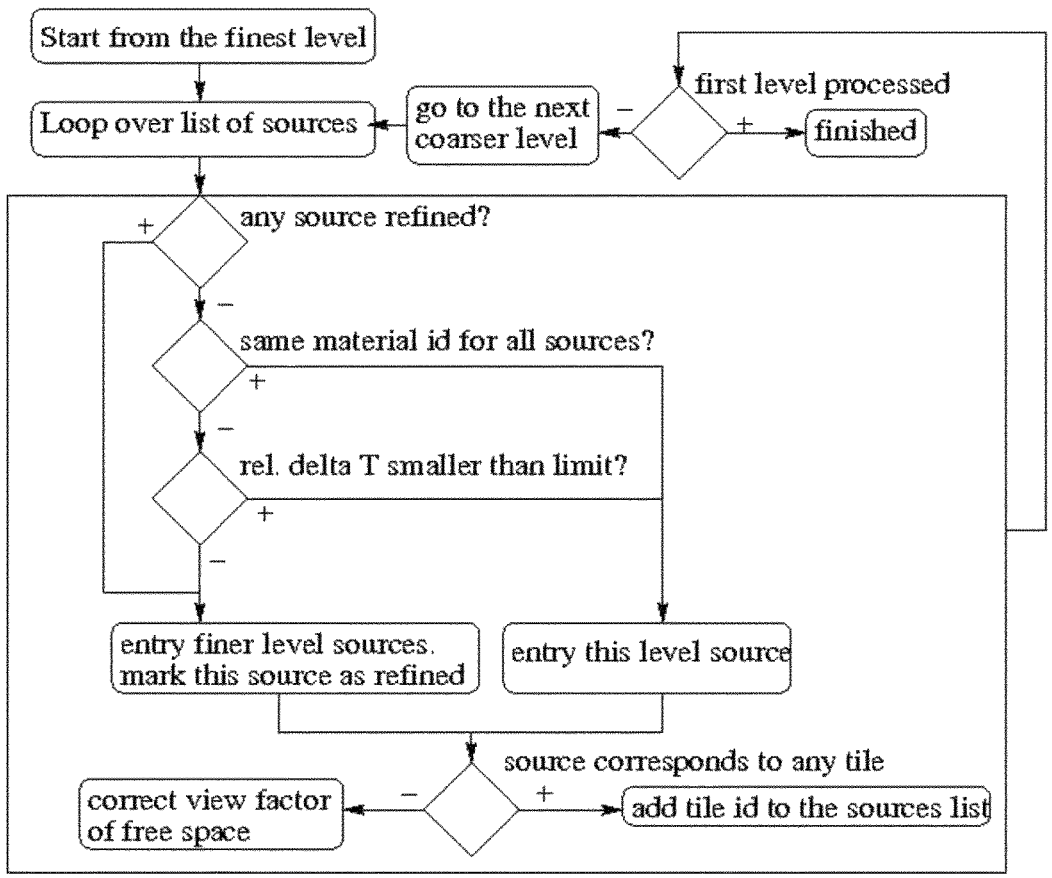
FIG. 6 is a flow chart for selecting radiation sources from different refinement levels of the angle discretization.

The sequence described above is represented in FIG. 6. The algorithm supplies k lists of radiation sources for k levels of uniform discretization. The adapted angle discretization in this case is chosen in such a manner that a concentration of representative radiation sources occurs in the angle regions, where an inconsistent dependence of the radiation intensity on the spatial direction can potentially be expected.

The jump in radiation intensity happens in the half-open cavities at a boundary between the hot opaque material and the open space. A jump of this kind is also caused by the thermal contrast between two adjacent opaque materials in the angle space. The materials labelled with different ID's may either be in direct thermal contact along their boundary in the angle space or partially mask one another.

The adapted discretization of the solid angle for the radiation tile observed takes place in this way through the selection of radiation sources. The subdivided surface of the unit sphere may be used to represent the angle discretization. Following adaptation it is completely covered without overlaps by spherical segments from different refinement levels.

Figure 7:
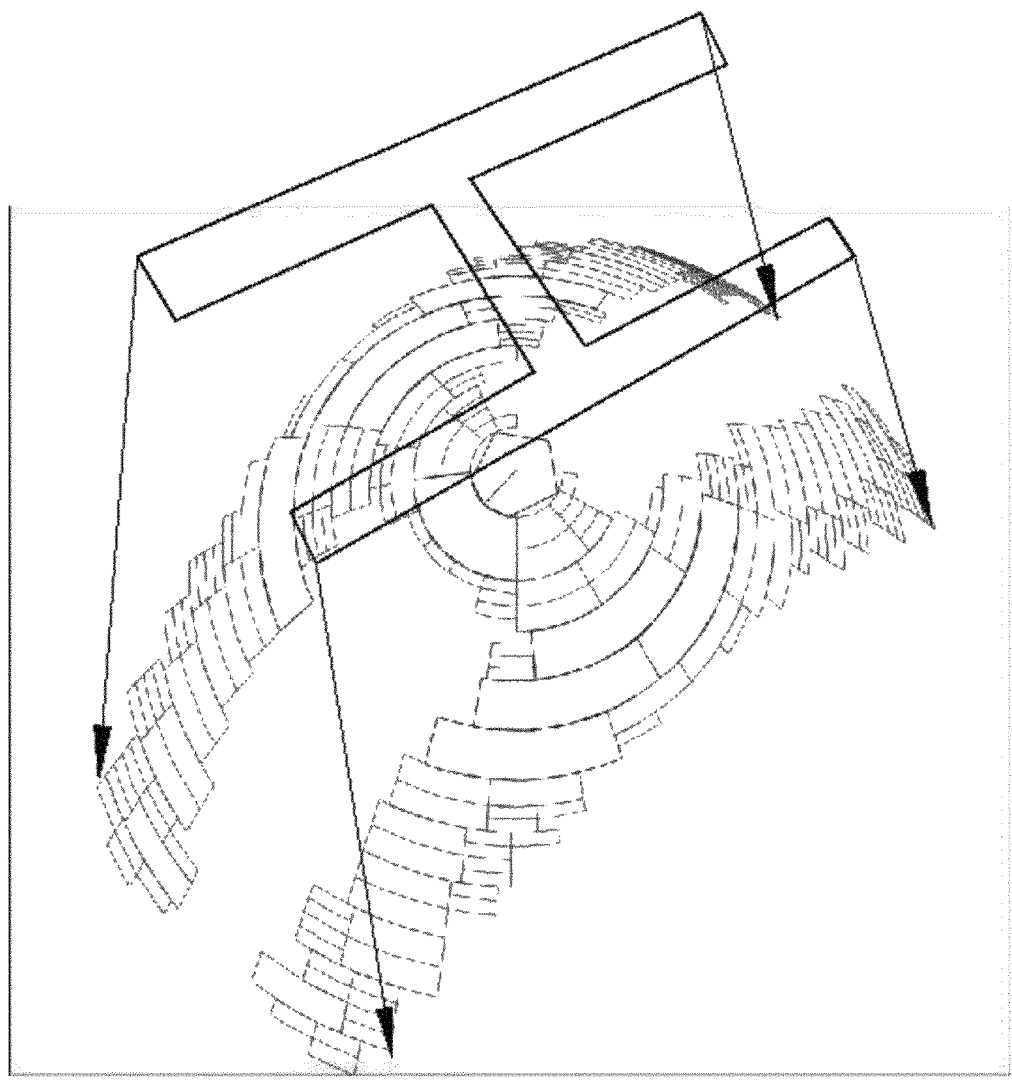
FIG. 7 shows an example of the adapted discretization of the solid angle, wherein the spherical rectangles from different levels are marked in the diagram in the refinement direction.

One example of the adapted discretization of the solid angle is shown in FIG. 7. A view factor of an H-shaped face 21, shown top left in the figure, is to be approximated by ray tracing. For this purpose, 3 discretization levels with the first level parameterized with (n=15,r=4) according to equation (7) were used. The number of rays is equal to 166, 664 and 2656 for the discretization level corresponding to 1-e, 2-e and 3-e, so that a total of 3486 rays are sent out to scan the hemisphere. After the geometric adaptation has been carried out 218 rays have been selected, which is smaller by a factor of 16 than at the finest level. The spherical rectangles from different levels are marked in the figure, sorted in the refinement direction by their size.

The outgoing heat fluxes, defined by sources from different levels, must be weighted differently in the calculation of the incident heat flux. The equation (6) for the incident heat flux is supplemented by pre-exponential factors of different levels:

$$q_{in}^{i} = \frac{1}{N} \sum_{level=1}^{k} \frac{1}{4^{k-1}} \left( \sum_{j=1}^{N_{level}} q_{out}^{j} \right). \quad (8)$$

For three levels k=3. Three totals with the weight factors 1, ¼ and ¹⁄₁₆ produce the total incident heat flux according to (8). The terms $q_{out}^{j}$ in the inner total are amounts from the list of radiation sources of the respective discretization levels.

Figure 17:
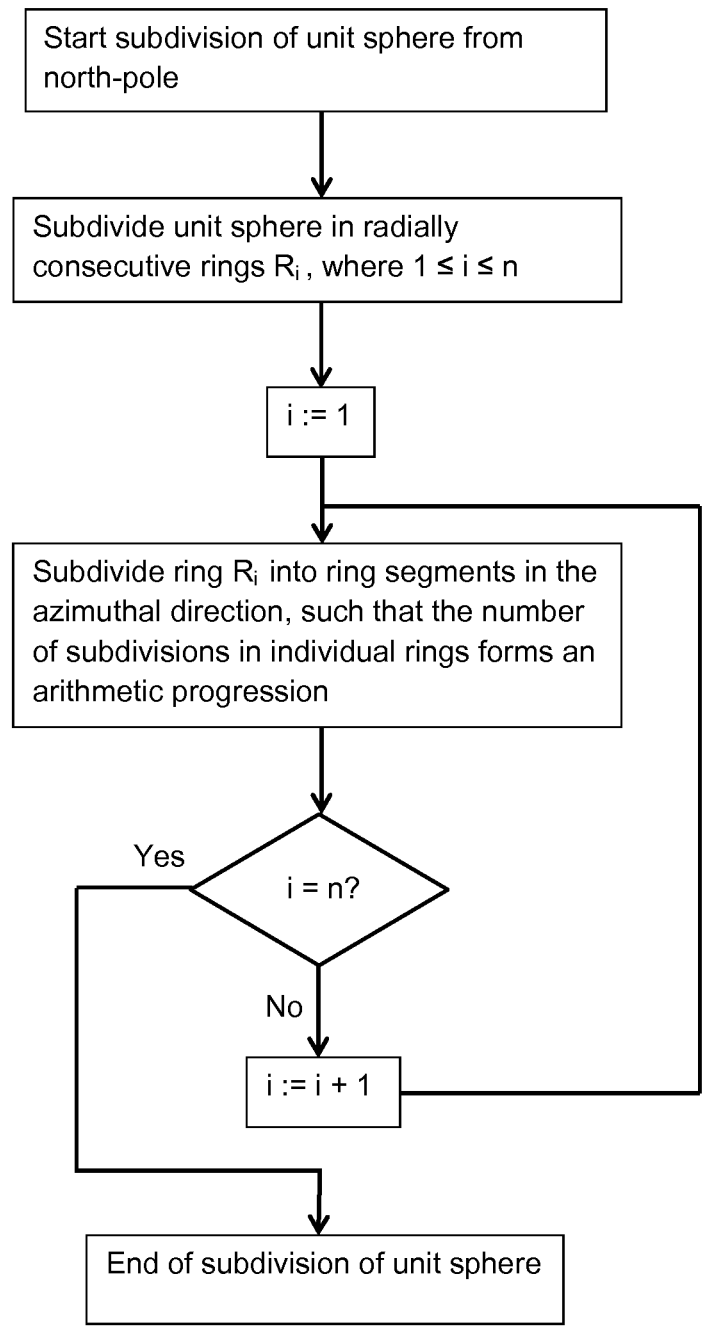
FIG. 17 shows a flow chart of the subdivision method of the unit sphere.

In FIG. 17 the method of subdividing a unit sphere is shown in detail as a flow diagram.

Ray Tracing

A voxel-based ray tracing method with reverse ray tracing is used.

A voxel supports the test as to whether the ray encounters an object in the given voxel. A voxel is a cube-shaped volume where the information on geometric objects is contained therein. When used with MAGMAsoft, a tensor product grid is provided as a grid consisting of the individual voxels itself. Each grid cell becomes a voxel. The method according to the invention is not however tied to the MAGMAsoft program and can be used for any voxel-based ray tracing method.

Reverse tracing means that all rays are initially sent out from the tile that receives the radiation. The radiation sources encountered by rays are thereby determined. However the radiation sources transmit energy physically to the receiver. The energy reaches the tile on the "straight" path, which corresponds to a reverse direction in the ray path of ray tracing. This is therefore referred to as ray tracing with reverse tracing.

The geometric objects that absorb and reflect the rays are the defined radiation tiles that are defined in the grid cells with the help of the material proximity.

Due to the structured nature of the numerical grid, it is sufficient for 3 tile ID's to be stored per grid cell. If 6 sides of a grid cell are referred to as the front, back, west, east, north, south, the 3 ID's refer to three possible tiles on the back, east and north side of the cell. Information relating to the tile on the three remaining sides of the cell (front, west and south) can be taken from the neighbouring cell. Positive values are allocated to the actually existing tiles on one side of the cell. The allocation takes place during the tile definition.

Before the ray tracing begins, the entire defined bundle of vectors indicating the directions of individual rays is centred about the normal vector of the respective tile. This is achieved through multiplication of the vectors with a rotational matrix which converts the central vector of the bundle in the Cartesian direction +Z into the normal vector of the tile.

The rays are then sent out from all refinement levels according to row. Ray tracing by the numerical grid involves the search for intersections between the continuation of the ray and the individual sides of the grid cell in which the ray is currently located (see FIG. 8).

For this purpose, three possible sides of the grid cell are checked for the next intersection. The possible sides are given by the sign of the three components of the ray direction $\vec{\Omega}$. The intersection with the minimum distance from the current ray position is treated as the next point on the ray. The side of the cell with the minimum length up to the intersection is searched for during this and the ray continued as far as the located intersection in direction $\vec{\Omega}$ by the located length $\Delta X^{ray}$:

$$X_{MIN} = \text{MIN}_{L=(i,j,k)} \frac{X_l - X_l^{ray}}{\Omega_l}. \quad (9a)$$

$$\Delta X_i^{ray} = X_{MIN} \Omega_i. \quad (9b)$$

Once the next intersection has been found, the ID of the corresponding tile is requested on the side of the grid cell.

If the ID corresponds to an actual tile, i.e. the side of the cell separates an opaque and a transparent material, the ray tracing is stopped and the global ID of the radiation source that has been located returned.

If the ID of a symmetry level corresponds to a Cartesian normal vector, the directional component normal to the symmetry plane is inverted and the reflected ray traced further.

Otherwise, the ray tracing procedure is repeated in the next grid cell until the ray hits a tile or leaves the boundaries of the numerical grid. In the latter case, a fixed ID of the outer space is returned.

Acceleration

Ray Tracing

Tile Clustering

The levels of finely networked radiant surfaces (plates) often occur with the modelled geometries. They produce very many radiating elements. The computational work involved in radiation modelling is linearly proportional to the number of radiation tiles using the model presented. Computational time can be saved if the fineness of the networking surpasses the required resolution in the distribution of the integrated heat flux (=irradiance) along the surface. In this case, it would be sufficient to have fewer coarser tiles than embedded by the numerical grid.

In published methods such as, for example, the DTRM model of FLUENT, reference is made to clustering of radiation tiles. Here, a plurality of adjacent radiation tiles is clustered if they deviate from a level by only a minimal angle (planarity). The ray paths and the heat fluxes are not calculated for each component of the cluster, but for the entire clustering at the location of its geometric centre. A similar technique is implemented for "moderate" acceleration in the current method.

All radiation tiles have a Cartesian orientation in the current model. The clustering of neighbours is allowed if they lie on a level and their grid cells also have the same opaque material.

Figure 9:
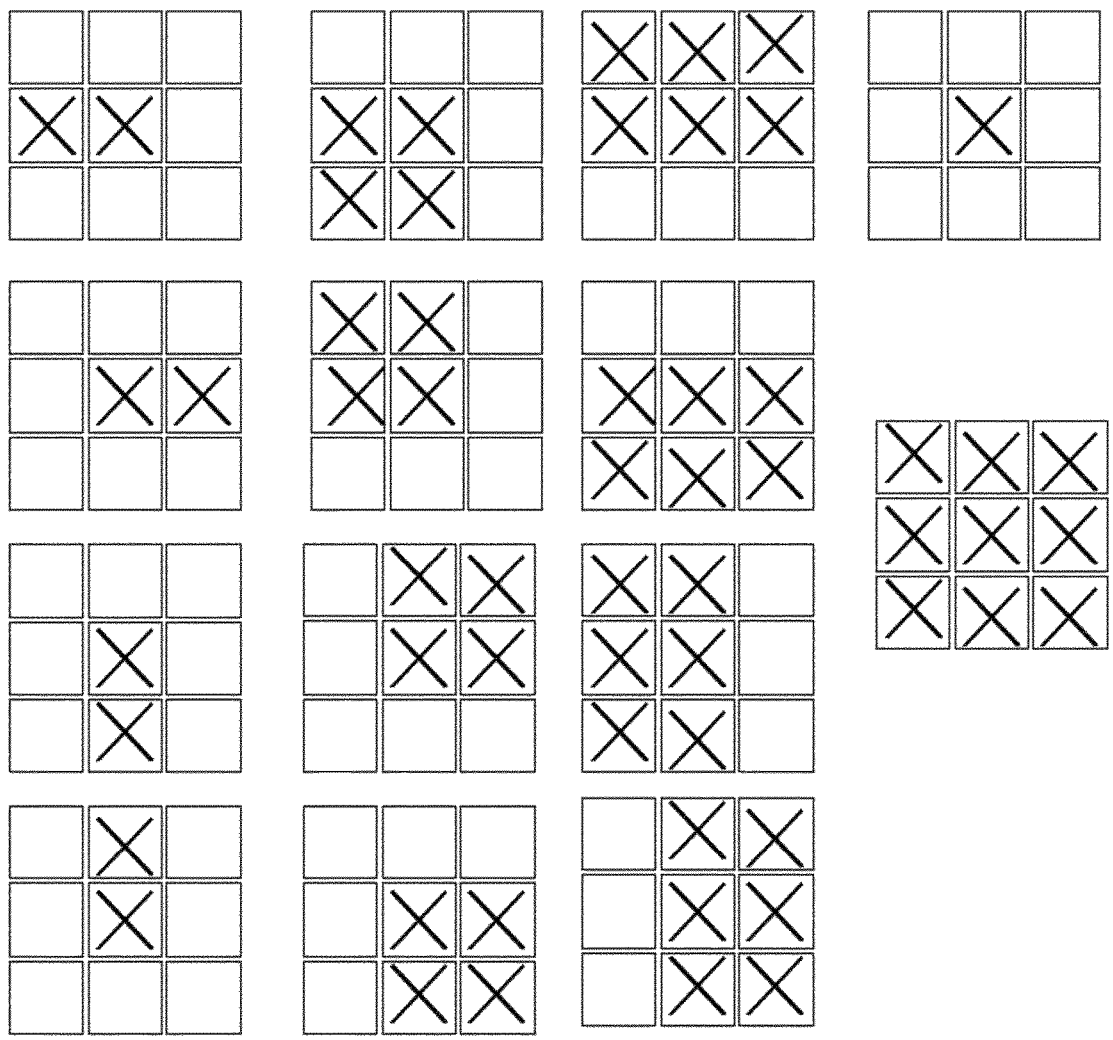
FIG. 9 illustrates supported variants of the tile structure starting with individual, radiating sides of the orthogonal grid cells (crosses)

Up to 3 clustered tiles are permitted in each of the two lateral directions along the surface. This means that between 1 and up to 9 sides of the grid cells can be clustered into a tile. The permitted variants are shown in FIG. 9.

Clustering of the radiation tiles usually occurs densely only on flat surfaces. In the case of curved geometries, the surface grid is stepped, as a result of which the number of coplanar sides of the grid cells is reduced.

Acceleration by a factor of 2 or slightly more is achieved on average by the implemented tile clustering method in the case of complex geometries. In program terms, the tile clustering in clusters consists of the following steps:

The list of grid cells belonging to a cluster radiation tile is stored in the data structure of a radiation tile.

Ray tracing starts for each cluster from its geometric centre.

Information on the radiation sources located and adapted is likewise stored for the entire cluster rather than for each component, however small.

The emitted heat flux of the cluster is calculated taking account of temperature distribution:

$$q_{em} = \epsilon \frac{\sum_i S_i T_i^4}{\sum_i S_i}. \quad (10)$$

where S is the face of side i and T the absolute temperature at the surface of the grid cell.

The calculated incident heat flux is the same for each member of the cluster, which leads to local smearing, smoothing of the heat flux. However this is the price of acceleration.

The mean incident heat flux is included in the energy balance (2) in the same way for each side of the grid cell from the cluster.

Anisotropic Chebyshev Distance

Figure 8:
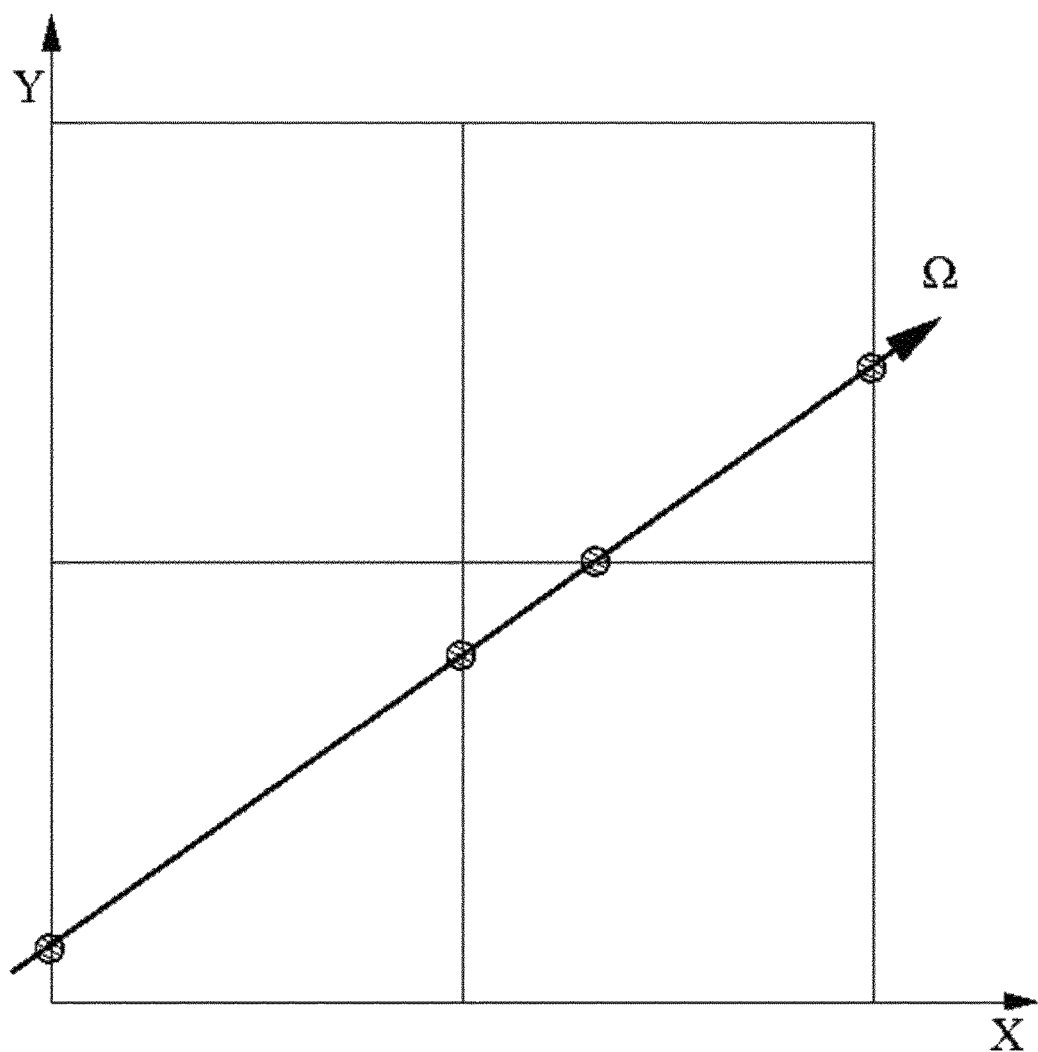
FIG. 8 shows the ray tracing diagram on the Cartesian grid comprising the detection of a sequence of intersections with the orthogonal grid.

Ray tracing according to the voxel-based ray tracing method requires each transparent grid cell lying on the ray path to be visited, see FIG. 8. The processing of many empty (i.e. transparent) cells may take up a significant part of the computing time, particularly when the model has large, air-filled cavities or fine networking in the intermediate spaces. A method would accelerate ray tracing, so that a ray immediately "tunnels" over a larger block of empty cells rather than visiting each grid cell encountered on the way. Information on the size of empty cell blocks of this kind should be available for this.

Empty blocks of this kind may be explicitly defined in the grid. A better method is referred to as the so-called Chebyshev distance or also the chess board distance. This is a distance measurement for discrete objects such as grid cells which is measured in whole numbers.

An illustration of the Chebyshev distance with the help of 2D examples is shown in FIG. 10. The following procedure is used in this case.

The distance from the dotted grid cells (zero cells) 22 is measured. FIG. 10A shows the isotropic classic Chebyshev distance. Cells at the same distance about the dotted zero cells at zero distance are arranged in a layer at the edge of a square. FIG. 10B shows the anisotropic Chebyshev distance for the upper left square. The anisotropic distance is correspondingly defined only for cells which lie in this square in relation to one of the zero cells 23. Otherwise, it is measured in exactly the same way as the isotropic distance in FIG. 10A. The directions observed (quadrant) are marked with the arrows 24 and 25 in the zero cells in the respective cases. It is evident that the anisotropic distance achieves greater values than the isotropic.

Use of the Chebyshev distance allows steps involved in ray tracing to be adaptively configured, independently of the current distance from a surface. If the current position of the traced ray is far removed from the next surface, the jump in the grid will also be correspondingly large. When the ray approaches a surface, the Chebyshev distance diminishes and with it the jump size too. The closer a ray gets to the surface, the slower its progress.

The classic isotropic Chebyshev distance is measured in relation to the marked grid cells using the zero distance. Cells of this kind are referred to below as zero cells. Cells at the same Chebyshev distance from a chosen zero cell are arranged in quadratic layers about the zero cell.

The distance is obtained by looking for grid cells that have not yet been marked. When at the end of the first step of the algorithm all the following cells from the first layer with a distance equal to 1 are found and marked, the next layer is assigned distance 2. For this purpose, all unmarked cells with direct neighbours or over edge neighbours with distance 1 are searched for. A similar procedure is followed with the other layers until no further cells without an entered distance are found.

The work involved in a direct calculation of the Chebyshev distance behaves accordingly as $\sim N^{4/3}$, where N is the number of grid cells.

This correlation is not obligatory, however, and can be optimized when upon the assignment of each following layer of cells at distance (i+1) only the grid cells at distance i located earlier and temporarily stored are processed. Only their neighbour cells are examined. In this way, the front of the "active" cells last located is propagated. The method requires written access into the outer cells of the stencil to be possible, however. It therefore places limitations on parallelization through the decomposition of domains.

The procedure involved in calculating the anisotropic Chebyshev distance is very similar. A distance for a cell in the isotropic case is now replaced by $2^2=4$ distances in a 2D case and $2^3=8$ distances in a 3D case, however. Each of the 4 distances is only calculated for grid cells in the 3D case, which lies in the corresponding quadrant, viewed from zero cells; see FIG. 10B. The assignment of distances there is calculated for the quadrant between the Cartesian directions −X and +Y. In 3D a distinction is made between the 8 octants. In both cases, unlike in the case of the isotropic Chebyshev distance, there is no assignment of distances in the cells which do not have zero cells in the given quadrant (2D) or octant (3D), from which the distance is measured.

Determining an octant requires the use of the anisotropic distance in ray tracing. A check is initially made to see in which octant the ray direction $\vec{\Omega}$ lies. The 8 anisotropic distances are then used in the 3D case, which corresponds to an opposite octant. If, for example, a ray comes from the direction (0.5, 0.2, −0.1), it lies in the octant (+X, +Y, −Z). The corresponding distance starting from the zero cells was measured in an octant against the ray direction. The necessary distance is therefore stored in the octant (−X, −Y, +Z).

The advantage of an anisotropic distance over an isotropic one is a more precise specification for a possible jump over a block of empty cells in ray tracing. The value of the anisotropic distance in an octant often turns out to be greater than with isotropic, cf. FIGS. 10A and 10B. The probability that a zero cell lies in an octant cube of the grid is smaller than in the isotropic case, where the corresponding cube is made up of 8 such octants. The ray tracing can therefore make greater jumps in the grid.

One disadvantage of the anisotropic distance is the memory additionally required for this in the case of ray tracing, which amounts to an extra 96 bytes per grid cell in the "int" distance type. In order to save memory, distances with the "unsigned char" type are assigned in this method. This type permits a maximum distance size of 128 grid cells. Greater values may theoretically occur in an application. The assignment of distances during their calculation is therefore interrupted once the layer with value 128 has been reached and the remaining unassigned transparent cells with the same value of 128 are assigned. In this way, the maximum possible length of a jump in the grid is limited during ray tracing.

Opaque cells with defined radiation tiles and cells on the outer edge of the numerical grid in contact with a transparent cell are defined as zero cells in the method. Said method ensures that all transparent cells are completely surrounded by a layer of zero cells and there is at least one reference zero cell for each transparent cell in the anisotropic case too.

Figure 11:
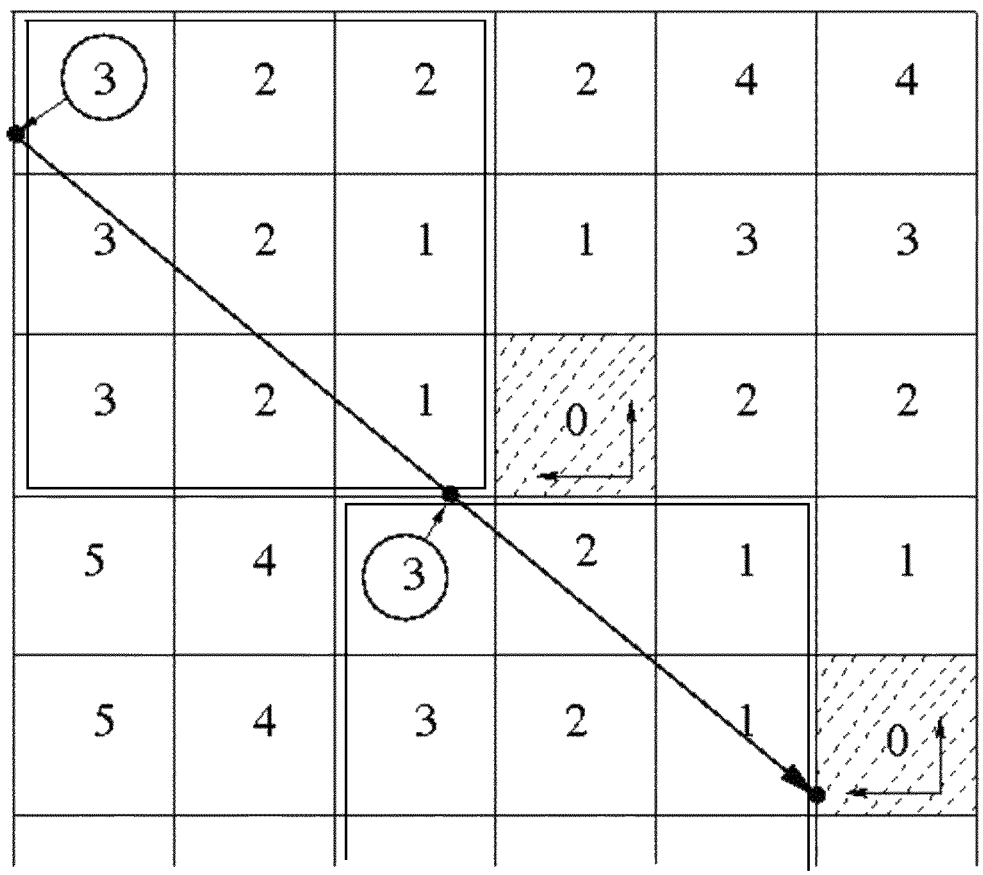
FIG. 11 shows an example of ray tracing in 2D supported by anisotropic Chebyshev distance.
Figure 12:
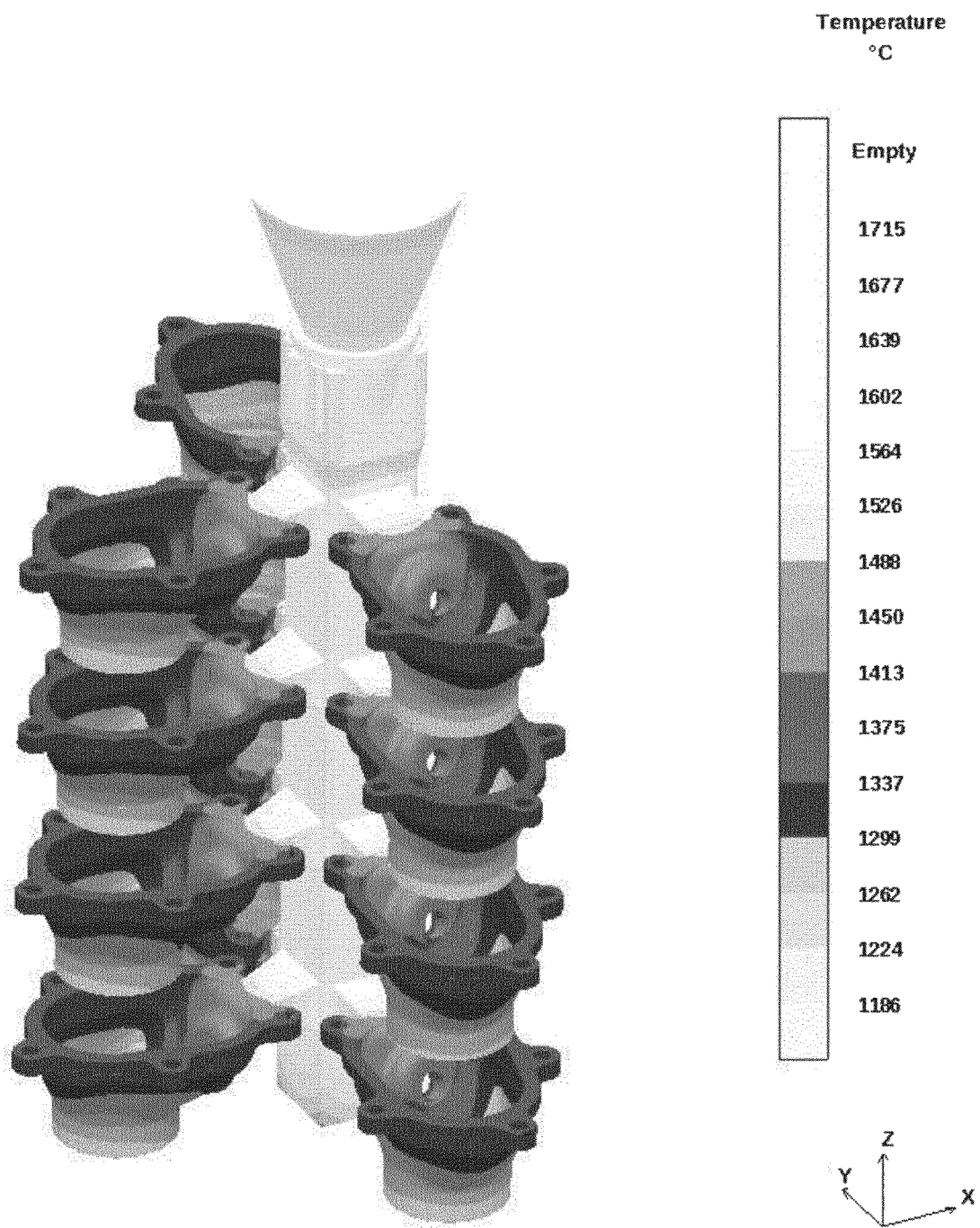
FIG. 12 shows an example of an actual application, namely of a thermal result for an investment casting project calculated using the radiation model.
Figure 13:
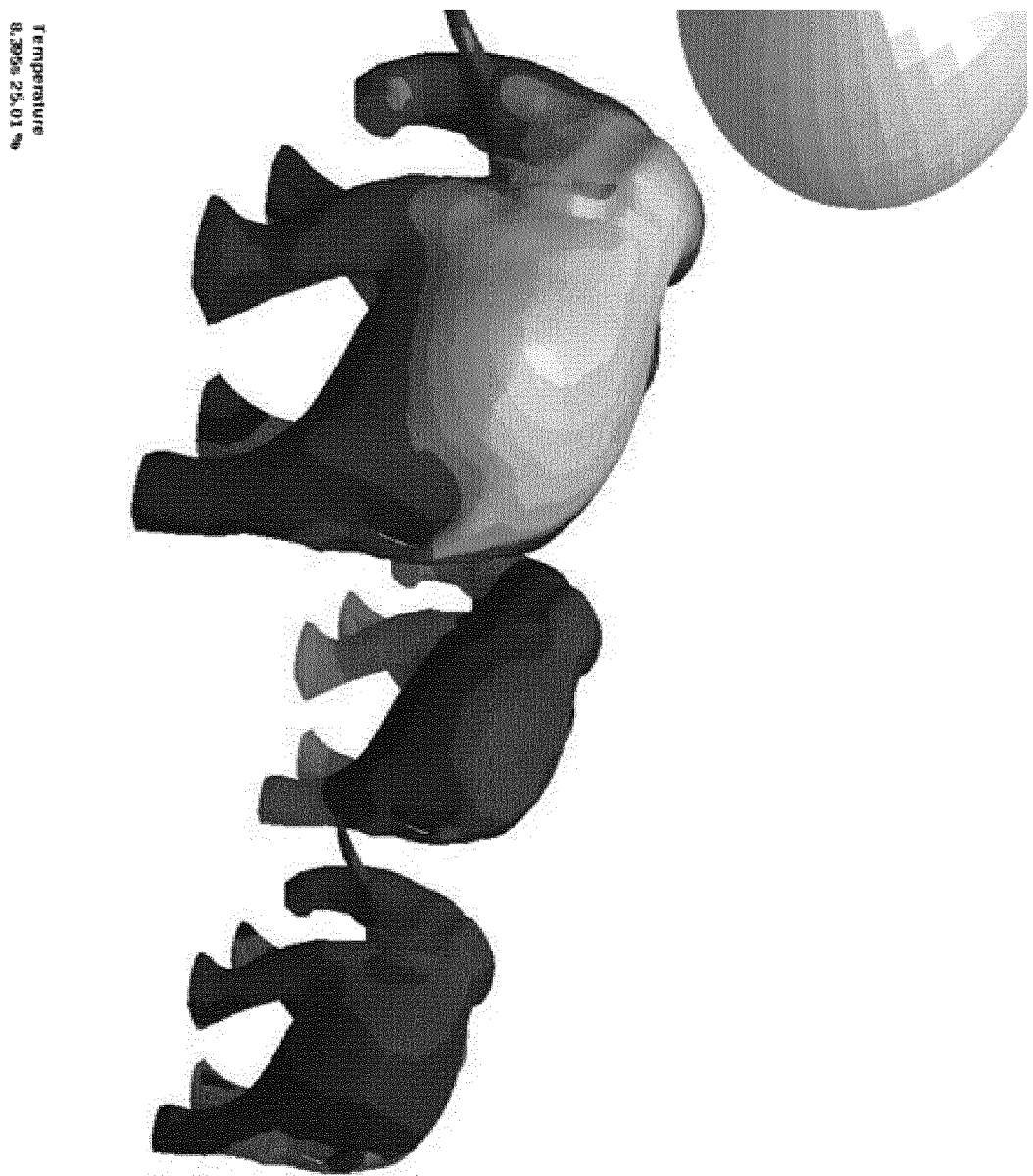
FIG. 13 is an illustration comprising an elephant family showing a test of the model efficiency, effects of masking and distance from the heat source, wherein the heat comes from the ball at the top left of the image.
Figure 14:
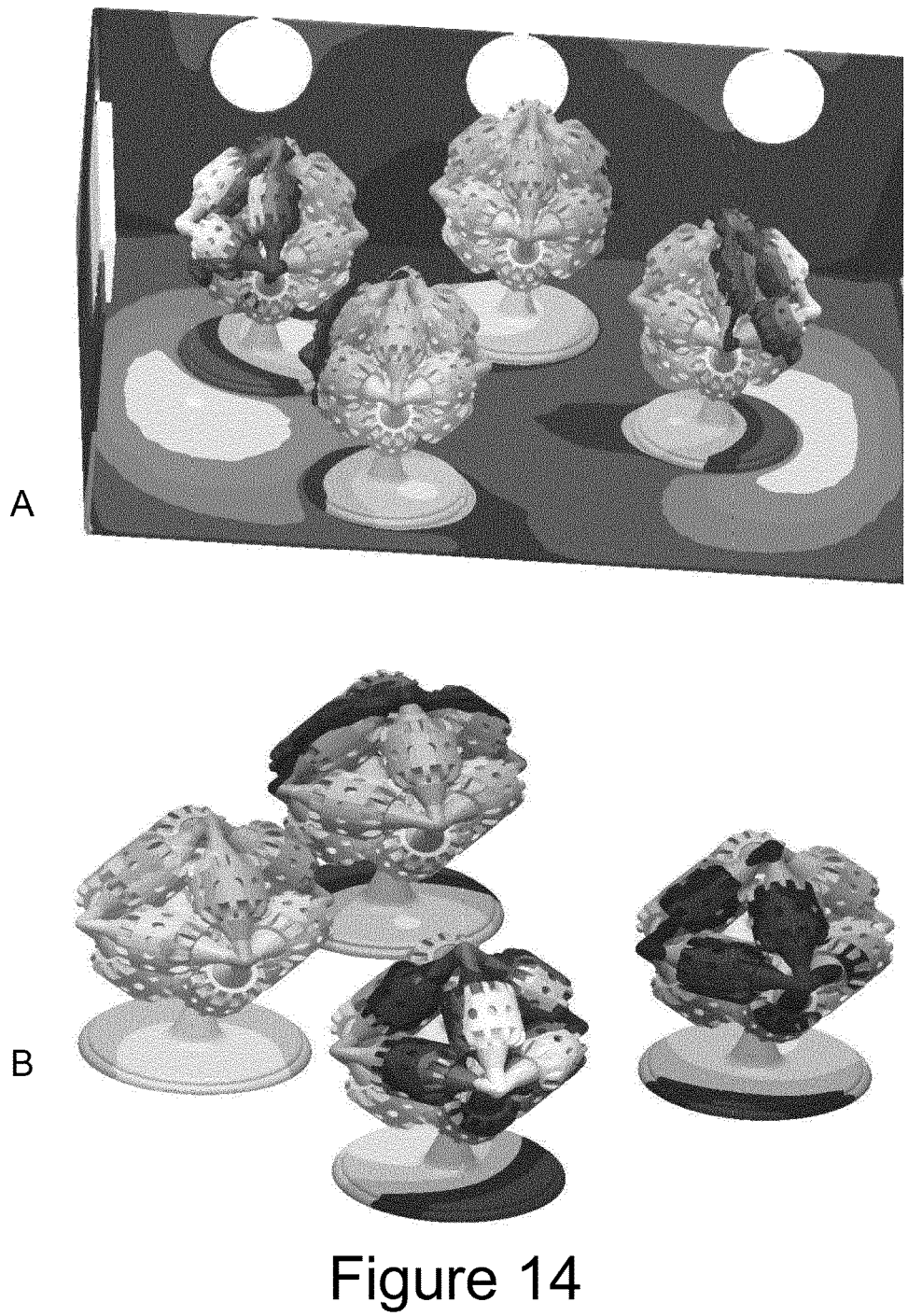
FIG. 14 illustrates modelling of the simultaneous heat treatment of 4 gearwheel assemblies in a furnace with semi-closed cavity: A: the entire model. B: tempered assemblies, wherein the heat sources are mounted on the left and right walls.
Figure 15:
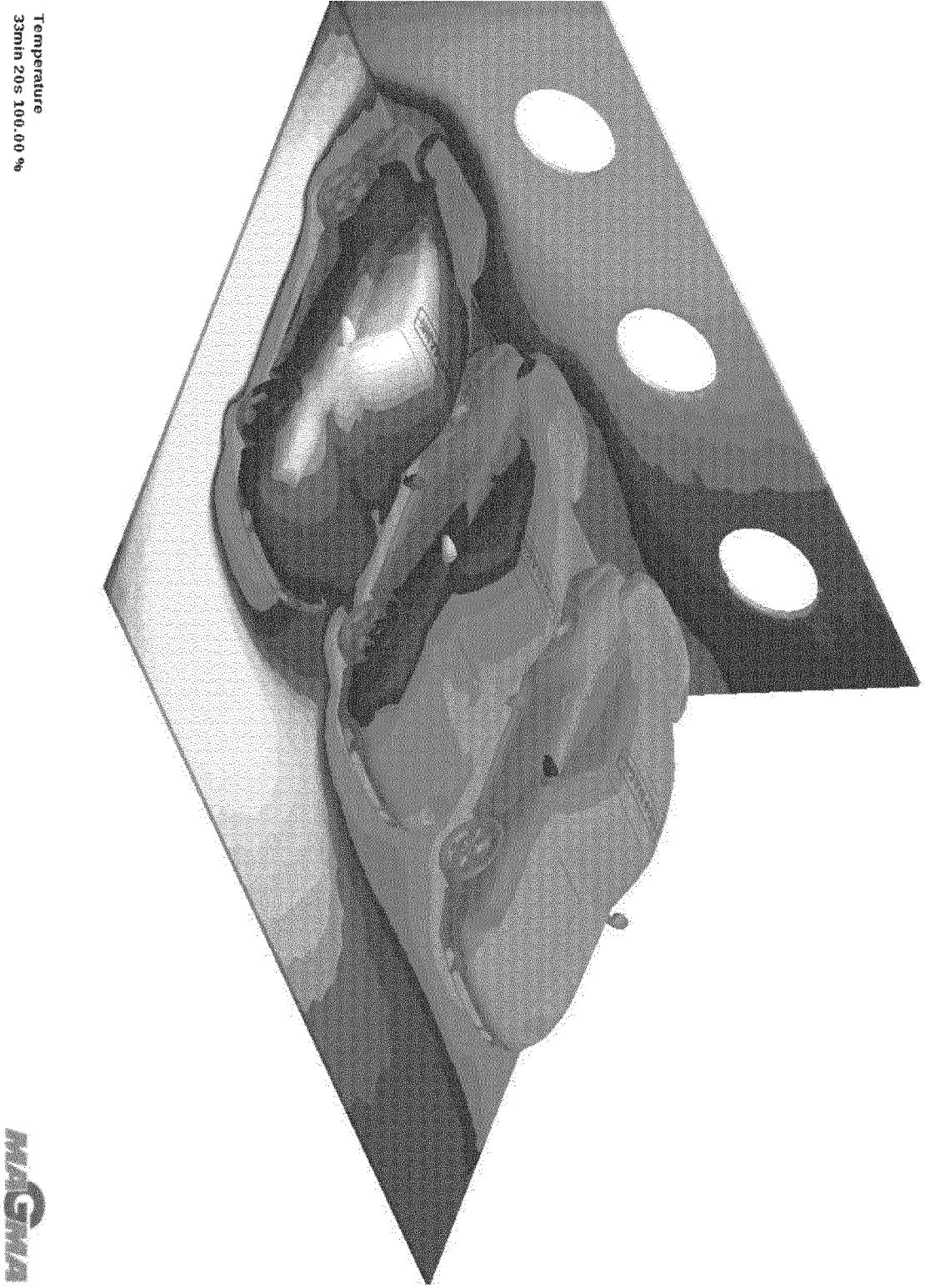
FIG. 15 shows calculated scenarios with three cars, wherein the heat source is at the front top, not shown in the image.
Figure 16:
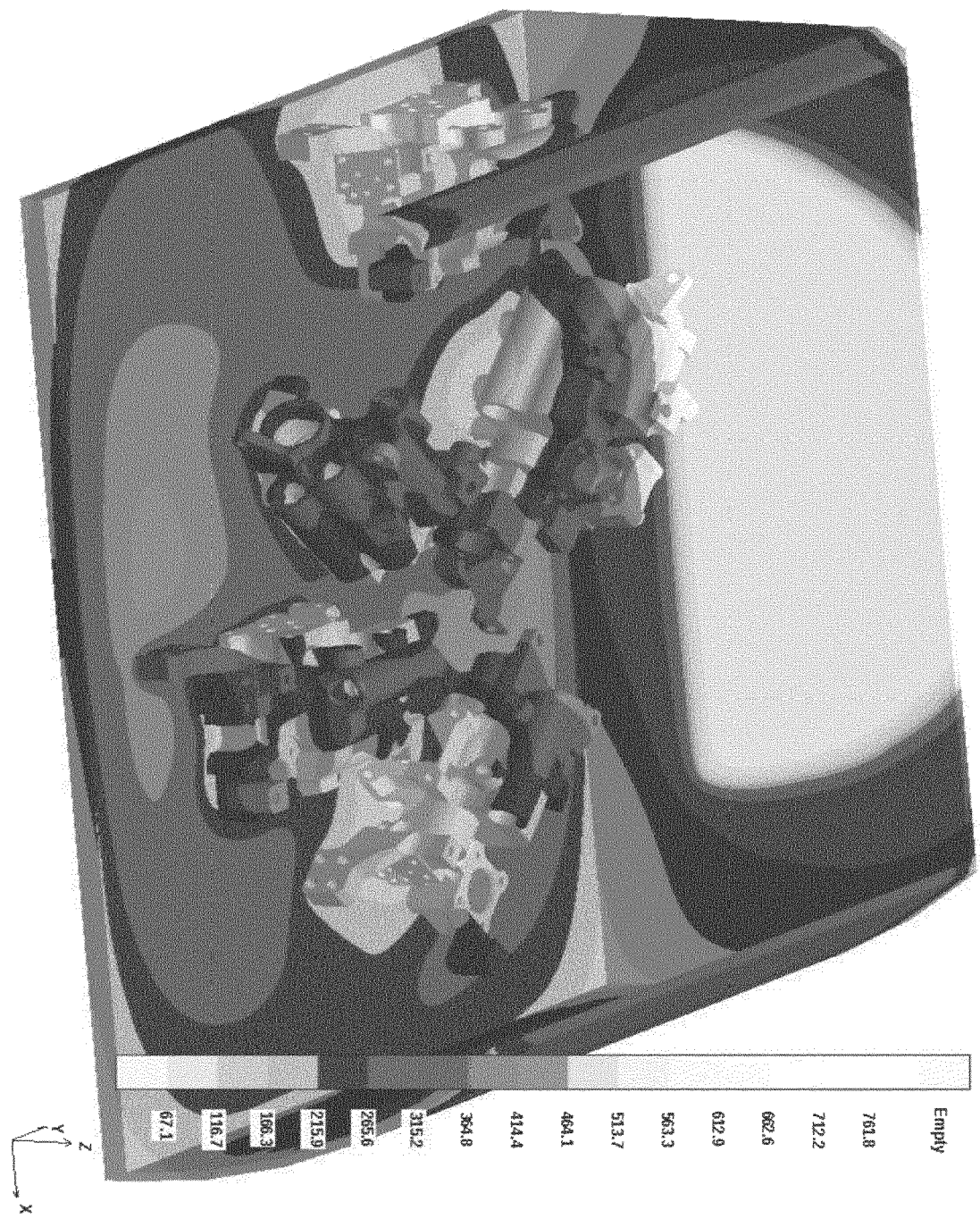
FIG. 16 shows heat treatment of 5 cast pump houses in a furnace.

An example of ray tracing in 2D, supported by anisotropic Chebyshev distance, is shown in FIG. 11. The grid and the calculated distance are taken from FIG. 10 on the right. The ray in the octant (+X, −Y) is processed with distance in the octant (−X, +Y). The initial position of the ray in the intersection with a cell side at top left lies in the cell at distance 3. The next intersection with the side of the 3×3 cube is therefore searched for. Following displacement of the position to the intersection, the Chebyshev distance is taken from the next cell in the direction of the ray path. It is once again equal to 3 and the next jump leads the ray right to the target at bottom right. In this example, 2 intersections were searched for; without using the Chebyshev distance the total would be 9.

The additional costs involved in ray tracing with Chebyshev distance are in the determination of the discrete position of the ray following the jump over a block of grid cells. The coordinates of the intersection can be similarly calculated according to the equations (9). The Cartesian coordinates on the edge of the grid cell $X_L$ are replaced, however, by the coordinates on the edge of the octant cube, which is equal to the coordinates of a grid cell further away.

The indices of the cell found after the jump in 3 Cartesian directions are unknown. They are determined according to the binary search algorithm. The index in the grid at the intersection is estimated in each direction starting from an equidistant grid in the cube. By comparing coordinates a check is then made to see whether the intersection located lies in the cell with the estimated index. If not, the corresponding half of the interval with the Chebyshev distance length is further halved. The procedure is repeated recursively in this manner until the located index of the cell belongs to the intersection. The work involved in the binary search in a fixed interval depends logarithmically on the length of the interval, i.e. for a maximum jump length of 128 cells, ~ln(128)=8 ln(2)~5 comparative operations would be required per direction.

Despite the additional work involved for a grid jump, the Chebyshev distance provides a substantial acceleration of the method, particularly for models in which a large amount of space has transparent material assigned to it.

Parallel Ray Tracing

Load distribution in the case of ray tracing:

Good scalability in parallel operation is the important prerequisite for efficiency with initialization of the model (Chebyshev distance, ray tracing) and its application in thermal calculation. The calculation time for ray tracing is decisive in this case.

The customary practice for parallelization with a distributed memory like MPI, when solving partial differential equations, is to decompose the computation domain. Its use for ray tracing has demonstrated poor scalability in this development, however. The reason for this is high communication costs. Data for the millions of rays must be transferred repeatedly between the individual partitions. The specific weight of the communication grows as the number of CPU's increases, which ultimately leads to poor scalability. Another method of parallelization is therefore developed in this model.

Ray tracing and calculation of the Chebyshev distance are performed simultaneously on each CPU for the entire grid. However, the radiation tiles are still locally defined on each CPU in this case.

The global grid model is created in the first section. The grid data of the entire grid are communicated to all CPU's. On the one hand, three rows of coordinates are communicated in three Cartesian directions. On the other hand, a flag is determined from root for the transparency of each grid cell and communicated in a numerical field of the "unsigned char" type to all CPU's. These data are sufficient to carry out the implementation of ray tracing on the tensor product grid independently of one another on each CPU. The symmetrical limits in the thermal model are also taken into account at this point.

The data determined locally by ray tracing via the radiation sources of the radiation tiles should, however, finally reach the CPU, where the corresponding file is locally defined. Communication costs are generated at this point. In order to minimize them, the following procedure is used.
1. The number of locally defined radiation tiles N existing on a CPU is determined.
2. The arithmetic mean $N_{av}$ is then calculated via the CPU's.
3. A portion $\Delta N$ of tiles is virtually removed from the donator by a CPU donator with the excess of tiles $N_1 > N_{av}$ and assigned to the CPU acceptor next located with $N_2 < N_{av}$, so that after this operation either the condition $N_1 = N_{av}$ or $N_2 = N_{av}$ is satisfied. The transferred portion in this case is equal to $N = MIN(N_1 - N_{av}, N_2 - N_{av})$. The indices of the tiles to be transferred and the ID's of the CPU acceptors are stored each time.
4. Step 3 is repeated until it is no longer possible to balance the tiles between the CPU's.

Once the parameters for the balancing of loads as described above are known to each CPU, local data on the position of the radiation tiles in the grid are communicated by the CPU donators to the CPU acceptors.

The CPU acceptors in this way receive a list of imported tiles to be processed, in addition to the list of their own tiles. The lists of own tiles to be processed on the CPU donators are correspondingly shortened.

Parallel Ray Tracing:
1. Prior to ray tracing, calculation of the anisotropic Chebyshev distance takes place on each CPU independently of one another. No communication is necessary in this case; calculations and results on each CPU are identical at this point. The work required for this calculation takes a few seconds, so that the organisation of a division of work between the individual CPU's and subsequent communication would barely be worthwhile in this case.
2. During ray tracing, all rays on each CPU are despatched independently of one another starting from the own tiles to be processed first, radiation sources are located and the selected sources are stored following their geometric and thermal adaptation. Storage of the radiation sources takes place in this step directly in the data structure of own radiation tiles.
3. Once all own tiles have been processed, it is the turn of the imported tiles on the CPU acceptors. The same ray tracing procedure and determination of the ray sources is used when processing these tiles. The radiation sources located and compressed by the adaptation procedure are temporarily stored in a buffer.
4. When all tiles have been processed, the results are communicated. The CPU acceptors transmit the located radiation sources of the imported tiles back to the CPU donators. MPI communication takes place asynchronously, wherein with an irregular distribution of tiles each donator may have several acceptors and each acceptor may have several donators. The radiation sources received from the donator are written into the data structure of the own tiles in this step straight after receipt by a CPU acceptor.
5. At the end of ray tracing, data that is no longer needed, such as Chebyshev distances and buffer stores for communication, are deleted.

Figure 18A:
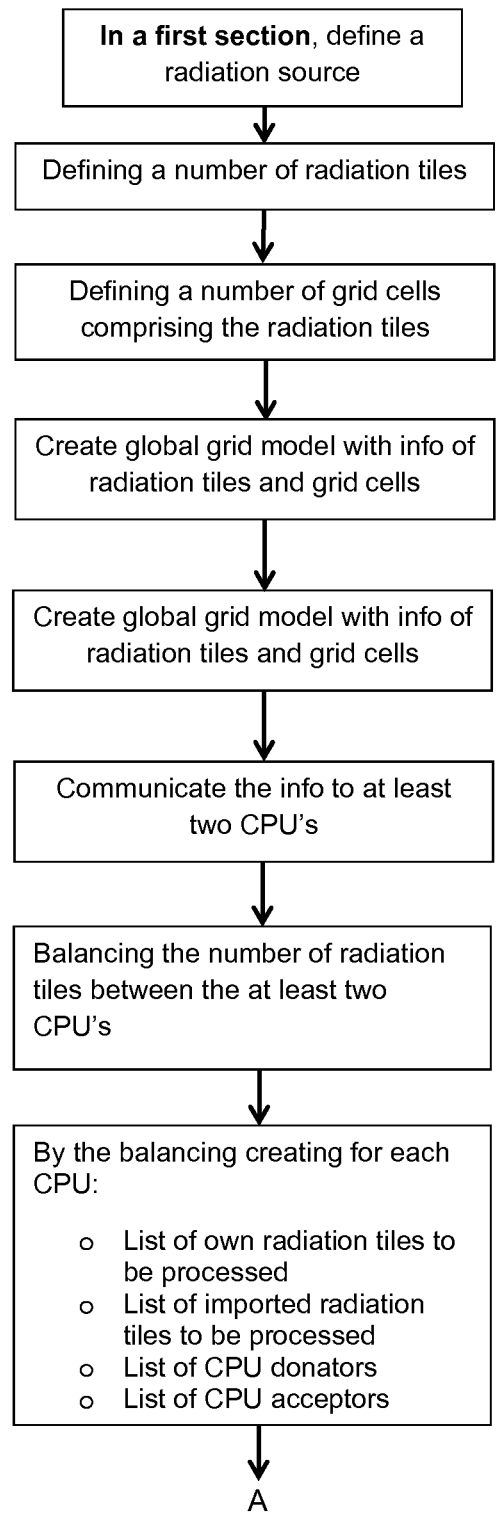
FIGS. 18a and 18b shows a flow chart of the method of performing ray tracing by parallel computing on a computer system comprising a plurality of CPU's.
Figure 18B:
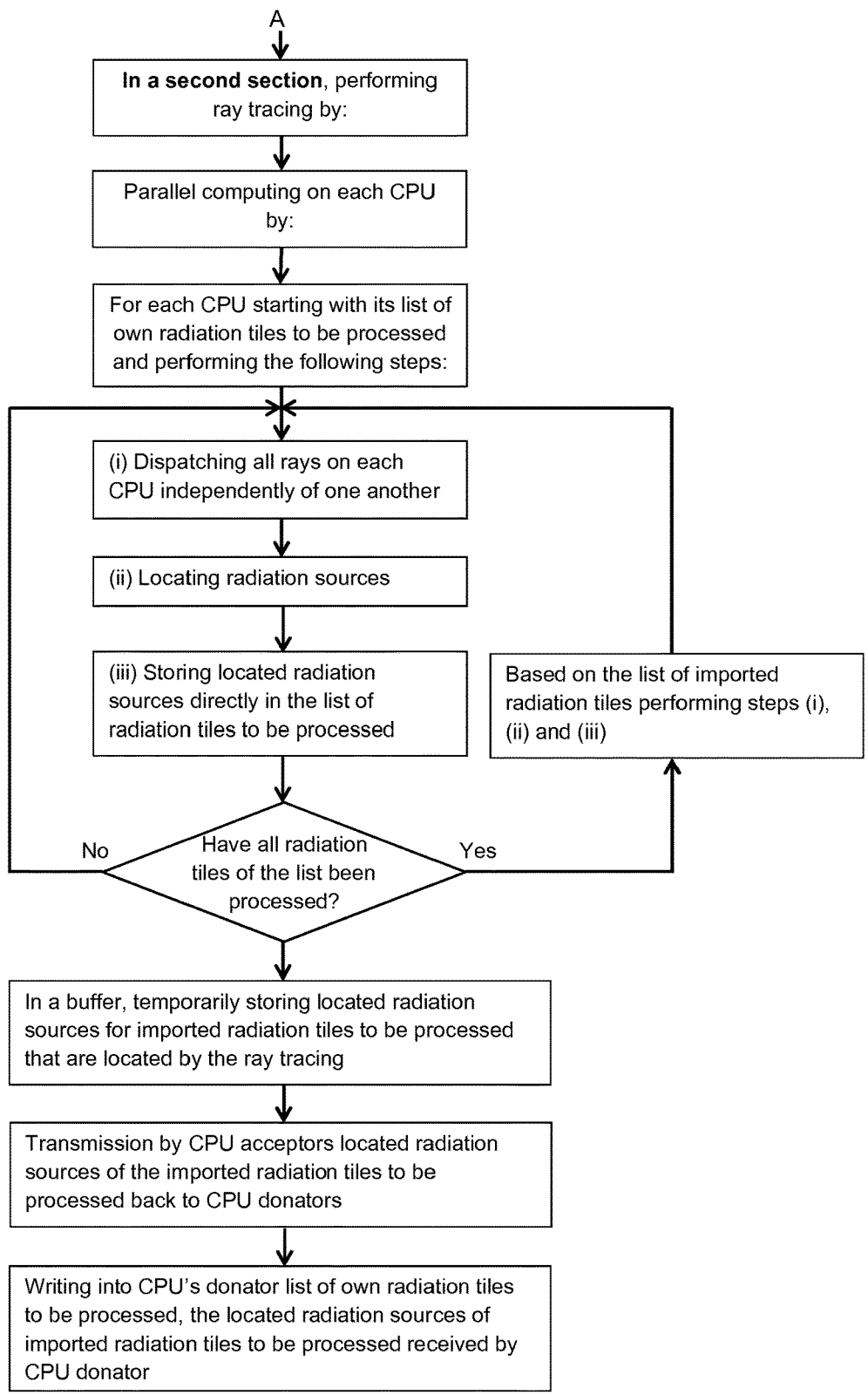

In FIGS. 18a and 18b, the method of ray tracing according to the present invention is shown in detail.

Thermal Calculation

In order to solve the summation of the outgoing heat fluxes in line with the multi-level method according to equation (8), a suitable algorithm is used for the solution by approximation of linear equation systems. The summation is exemplified below using the Gauss-Seidel iterative method, although it could also be solved by means of other algorithms, for example the Jacobi method or the SOR method.

In one embodiment, the Gauss-Seidel iterative method is used to calculate the absorbed heat flux on each radiation tile. This flux represents the final result for the thermal model from the radiation side. Knowledge of the outgoing heat fluxes is necessary across all CPU's at this point, as the path of rays taken into account have been calculated for each ray without taking account of the domain decomposition.

It is advantageous for the Gauss Seidel iterative method to take place on each CPU only for local radiation tiles. The summation of the outgoing heat fluxes in line with the multi-level method according to equation (8) contains contributions from all tiles determined by ray tracing, including from other CPU's.

In this way, the outgoing heat fluxes in the algorithm can be made globally visible. Each radiation tile is assigned a continuous, global index, wherein the same indices can be advantageously stored instead of the radiation sources for each tile during ray tracing.

The global outgoing heat fluxes may be indicated in an array according to the global index, wherein before each passage of the Gauss-Seidel loop, the outgoing flows from all local tiles are communicated into the global array.

POTENTIAL AREAS OF APPLICATION, EXAMPLES

The model of thermally coupled surface radiation for diffuse grey radiators introduced above may find an application in many technical processes where cavities or semi-transparent materials and high temperatures exist. The attractive aspect of the method lies in its ease and very short calculation time, within which the most rigorous problems in the modelling of the remote action of thermal radiation are processed.

The most interesting applications in simulating casting processes are investment casting, heat treatment and block casting with plant configurations assembled in series.

Further applications are associated with the production and operation of industrial furnaces, for example in the case of glass production or ceramic production, in chemistry, crystal growing, metallurgy, or also in the food industry, e.g. ovens.

Various examples of the application of the method are shown in FIGS. 12 to 16. As shown, the method here is not limited to only one heat source, but a plurality, e.g. two (FIG. 14) and a higher number of heat sources can also be used.

The method indicated here for the discretization of a solid angle for use in a simulation process can be conceived of in its application not only in connection with thermally coupled surface radiation, but can also be used in other calculation and simulation processes where acceleration and savings in computer time and computer memory used, such as rendering software, for example, in general and computer games in particular or scientific rendering tools is of importance.

The method of ray tracing indicated here for use in a simulation process can be conceived of similarly in its application not only in connection with thermally coupled surface radiation, but can also be used in other calculation and simulation processes where acceleration and savings in computer time and computer memory used, such as rendering software, for example, in general and computer games in particular or scientific rendering tools is of importance. In particular, the unconventional method of parallel computing proposed here to accelerate a ray tracing calculation alone and in combination with anisotropic Chebyshev distance calculations and/or additional acceleration through tile clustering is not known to the inventor from the prior art.

CLOSING COMMENTS

The term "comprising" as used in the claims does not exclude other elements or steps. The term "a" or "an" as used in the claims does not exclude a plurality. A single processor or other unit may fulfil the functions of several means recited in the claims.

Although the present invention has been described in detail for purpose of illustration, it is understood that such detail is solely for that purpose, and variations can be made therein by those skilled in the art without departing from the scope of the invention.

The invention claimed is:

1. A method for improving parallel computing on a computer system comprising a plurality of central processing units (CPUs) for in a simulation or calculation process of heat flux from a radiant surface using ray tracing, the method comprising executing on at least one central processing unit (CPU) the steps of:
   1) In a first step
      a) defining at least one radiation source;
      b) defining a number of radiation tiles forming a plurality of radiation tiles, and a number of grid cells forming a plurality of grid cells, said plurality of grid cells comprising said plurality of radiation tiles;
      c) creating a global grid model comprising grid data, said grid data comprising information on said plurality of radiation tiles and said plurality of grid cells;
      d) communicating said grid data of said global grid model to said plurality of CPUs;
      e) balancing said number of radiation tiles between said plurality of CPUs by
         I. determining the number of locally defined radiation tiles N existing on a CPU;
         II. calculating an arithmetic mean $N_{av}$ across said plurality of CPUs;
         III. virtually removing a portion $\Delta N$ of radiation tiles from a CPU-donator with an excess of radiation tiles $N_1 > N_{av}$ and assigning said excess to a CPU-acceptor next located with $N_2 < N_{av}$, such that either a condition $N_1 = N_{av}$ or $N_2 = N_{av}$ is satisfied, where the transferred portion is equal to $\Delta N = MIN(N_1 - N_{av}, N_2 - N_{av})$; and
         IV. repeating step III, until it is no longer possible to balance the tiles between the CPUs;
         thereby creating for each CPU a list of remaining locally defined (own) radiation tiles to be processed and a list of assigned excess (imported) radiation tiles to be processed, and a list of CPU donators and CPU acceptors; and
   2) In a second step:
      g) performing ray tracing by parallel computing on each CPU, starting for each CPU with said CPU's list of remaining locally defined radiation tiles to be processed, by
         dispatching all rays of said ray tracing on each CPU independently of one another,
         locating radiation sources,
         storing said located radiation sources directly in said list of remaining locally defined radiation tiles to be processed; and h) using said CPU acceptors, when all remaining locally defined radiation tiles to be processed have been processed,
         repeating the above step h) for assigned excess radiation tiles to be processed on said CPU acceptors until there are no radiation tiles to be processed, and
         temporarily storing in a buffer said located radiation sources for said assigned excess radiation tiles to be processed that are located by said ray tracing;
      i) using said CPU acceptors, after processing of all radiation tiles, transmitting said located radiation sources of said assigned excess radiation tiles to be processed back to said CPU donators; and
      j) using said CPU donators, writing said located radiation sources of said assigned excess radiation tiles to be processed as received by said CPU donator into said CPU donator's list of remaining locally defined radiation tiles to be processed, preferably immediately after receipt from a CPU acceptor.

2. The method of claim 1, wherein said method of ray tracing is a method of voxel-based ray tracing with reverse ray tracing.

3. A method according to claim 1, wherein, all rays leaving a radiation tile during ray tracing are characterized as a bundle of vectors, each vector indicating a direction of an individual ray $\vec{\Omega}$, and wherein said bundle of vectors, before ray tracing begins, is centred about a normal vector of each respective radiation tile through multiplication of said vectors with a rotational matrix which converts a central vector of said bundle of vectors in a Cartesian direction +Z into said normal vector of said radiation tile.

4. A method according to claim 1, wherein if for each side of each grid cell of said plurality of grid cells an identification (ID) is assigned, then for each of said radiation tiles, three identifications (ID's) are stored per grid cell for each radiation tile, thereby fully characterizing said plurality of radiation tiles with respect to said global grid model.

5. A method according to claim 4, comprising performing during ray tracing a search for a next intersection between a continuation of a dispatched ray and an individual side of a grid cell in which said dispatched ray is currently located.

6. A method according to claim 5
   wherein three sides of said grid cell wherein said dispatched ray is currently located are checked for a next intersection, said sides given by a sign of three components I, j, k of said ray direction $\vec{\Omega}$;
   wherein a next intersection having the minimum distance $X_{MIN}$ from said current ray position defines a next point on said dispatched ray; and
   wherein an individual side of said grid cell wherein said dispatched ray is currently located having a minimum length $MIN_L$ up to said next intersection $X_l$ is determined, and said dispatched ray continued as far as said located next intersection $X_l$ in said dispatched ray direction $\Omega_l \vec{\Omega}$ by a located length $\Delta X^{ray}$, where:

$$X_{MIN} = MIN_{L=(i,j,k)} \frac{X_l - X_l^{ray}}{\Omega_l} \text{ and } \Delta X_i^{ray} = X_{MIN} \Omega_i;$$

wherein, when said next intersection has been found, an identification (ID) of a corresponding tile on said individual side comprising said next intersection of said grid is requested; and wherein if said identification (ID) of said corresponding tile corresponds to an actual radiation tile, said ray tracing is stopped and a global identification (ID) of a radiation source that has been located is returned; or if said identification (ID) of a corresponding tile corresponds to a symmetry plane having a Cartesian normal vector, a directional component of said dispatched ray normal to said symmetry plane is inverted and said dispatched ray traced further as a reflected ray; or otherwise said ray tracing procedure is repeated in a next grid cell until said dispatched ray encounters a radiation tile or leaves the boundaries of said grid model, in which latter case, a fixed identification (ID) is returned indicating outer space.

7. The method according to claim 1, wherein the simulation or calculation process is a method of computer image rendering.

8. A method according to claim 1, said method comprising in said first step: d) reducing said number of radiation tiles by tile clustering to generate a number of radiation tiles smaller than said number of radiation tiles initially defined.

9. A method according to claim 1, said method comprising in said second step: g) calculating for each radiation tile an anisotropic Chebyshev-distance prior to h) performing ray tracing by parallel computing on each CPU, starting for each CPU with said CPU's list of remaining locally defined radiation tiles to be processed.

10. A method according to claim 1, said method comprising in said second step: while h) performing ray tracing by parallel computing on each CPU, starting for each CPU with said CPU's list of remaining locally defined radiation tiles to be processed: after locating radiation sources, geometrically and/or thermally adapting said located radiation sources.

11. A method according to claim 1, said method comprising in said second step: l) deleting data that is no longer needed after k) said located radiation sources of said assigned excess radiation tiles to be processed as received by said CPU donator are written into said CPU donator's list of remaining locally defined radiation tiles to be processed, said data being either said located radiation sources for said assigned excess radiation tiles temporarily stored in a buffer in step i), and/or the anisotropic Chebyshev-distances calculated for each radiation tile in step g).

12. A computer software product on a non-transitory computer-readable medium comprising a software code for implementing a method according to claim 1.

* * * * *